(12) United States Patent
Leschinsky

(10) Patent No.: US 12,317,885 B2
(45) Date of Patent: Jun. 3, 2025

(54) MODULAR SYSTEM FOR A DECOY

(71) Applicant: Splash Landing, LLC, Severance, CO (US)

(72) Inventor: Shawn Leschinsky, Severance, CO (US)

(73) Assignee: Splash Landing LLC, Severance, CO (US)

( * ) Notice: Subject to any disclaimer, the term of this patent is extended or adjusted under 35 U.S.C. 154(b) by 0 days.

(21) Appl. No.: 18/439,118

(22) Filed: Feb. 12, 2024

(65) Prior Publication Data

US 2024/0268370 A1 Aug. 15, 2024

Related U.S. Application Data

(60) Provisional application No. 63/444,793, filed on Feb. 10, 2023.

(51) Int. Cl.
*A01M 31/06* (2006.01)

(52) U.S. Cl.
CPC .................... *A01M 31/06* (2013.01)

(58) Field of Classification Search
CPC ..................................... A01M 31/06
See application file for complete search history.

(56) References Cited

U.S. PATENT DOCUMENTS

| | | | | |
|---|---|---|---|---|
| 2,342,107 A * | 2/1944 | Agius | .................. | A01M 31/06 43/3 |
| 4,658,530 A * | 4/1987 | Ladehoff | ............... | A01M 31/06 43/3 |
| 6,339,895 B1 * | 1/2002 | Lawson | ................ | A01M 31/06 43/3 |
| 11,517,011 B1 * | 12/2022 | Barker | .................. | F16M 13/02 |
| 2013/0111800 A1 * | 5/2013 | Pifer | .................... | A01M 31/06 43/3 |

* cited by examiner

*Primary Examiner* — Richard G Davis
(74) *Attorney, Agent, or Firm* — Craig R. Miles; CR MILES P.C.

(57) ABSTRACT

Disclosed herein are embodiments of a modular system for a decoy, and methods of making and using such a modular system, whereby the modular system includes an adapter configured to couple to the decoy, the adapter comprising a connector first portion which removably couples to a connector second portion to form a connection therebetween; a keel module configured to removably couple to the adapter, the keel module comprising the connector second portion; and a stand configured to removably couple to the adapter, the stand comprising the connector second portion. As to particular embodiments, the modular system can further include a stake configured to removably couple to the adapter, the stake comprising the connector second portion. The keel module, the stand, and/or the stake can be configured for easy, quick, and repeatable attachment to or removal from the adapter and accordingly, the decoy, facilitating use of one decoy in multiple environments.

20 Claims, 29 Drawing Sheets

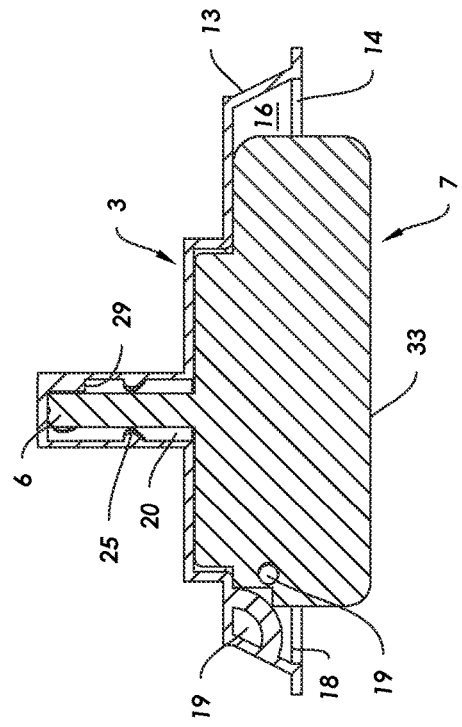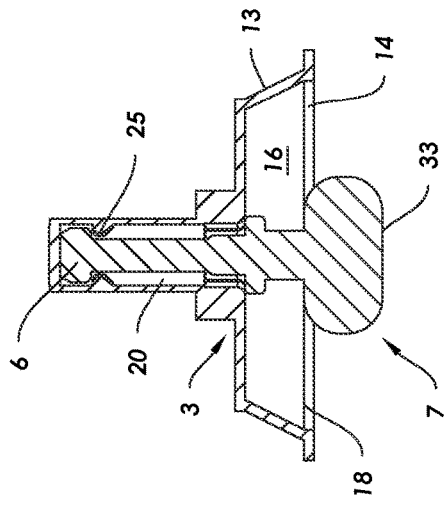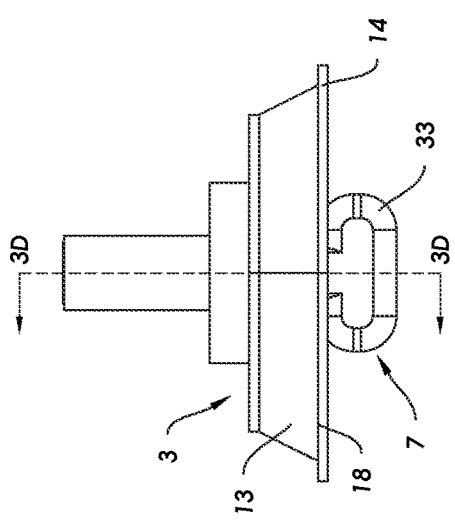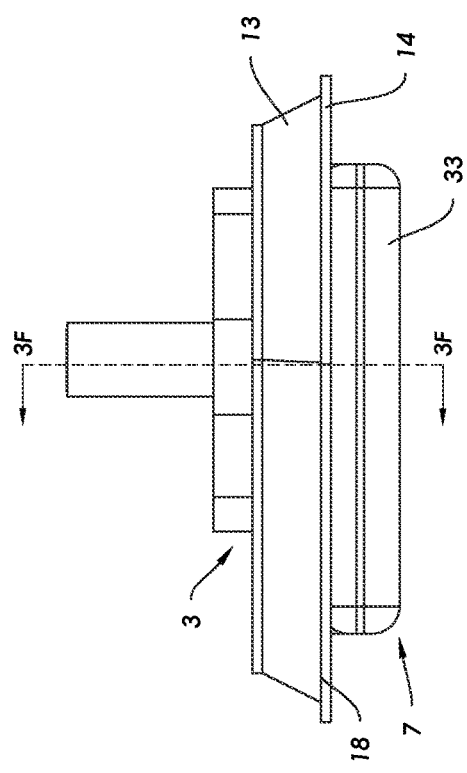

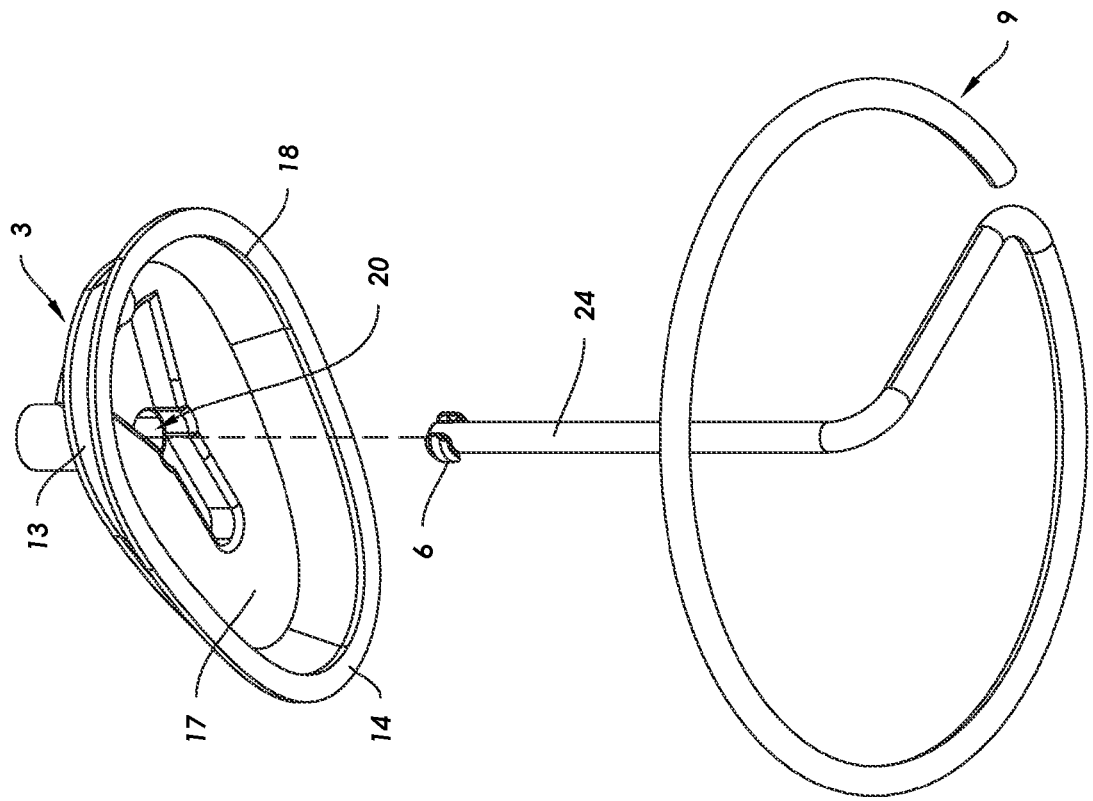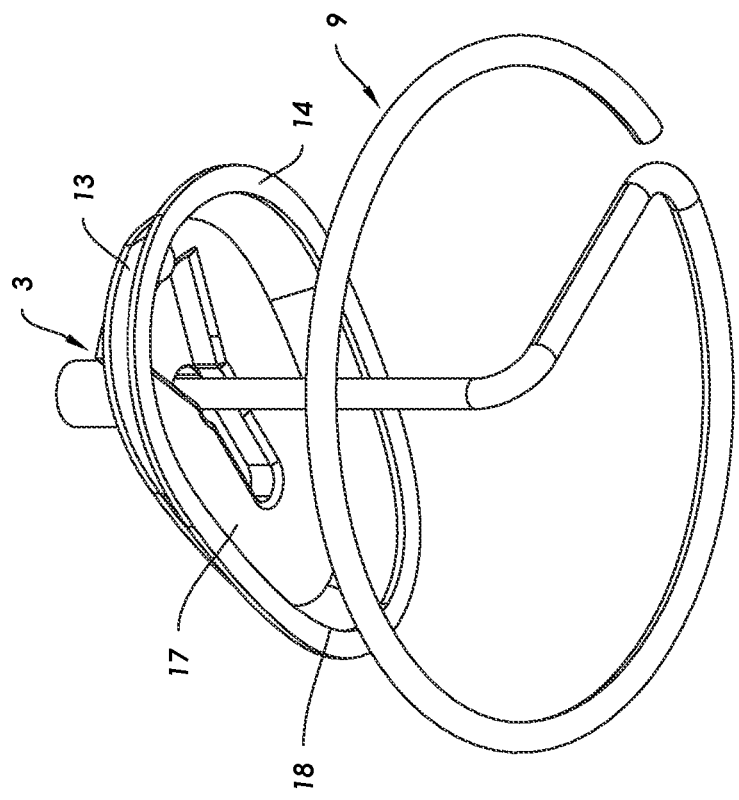

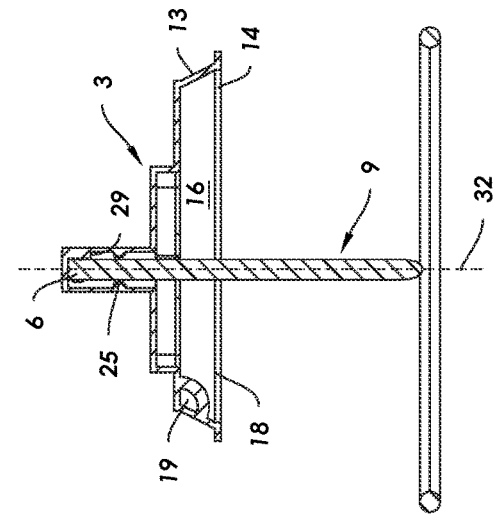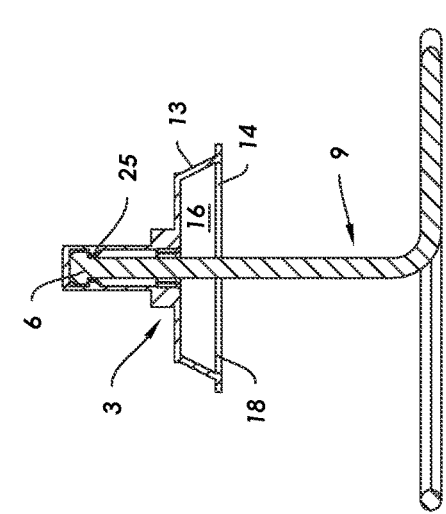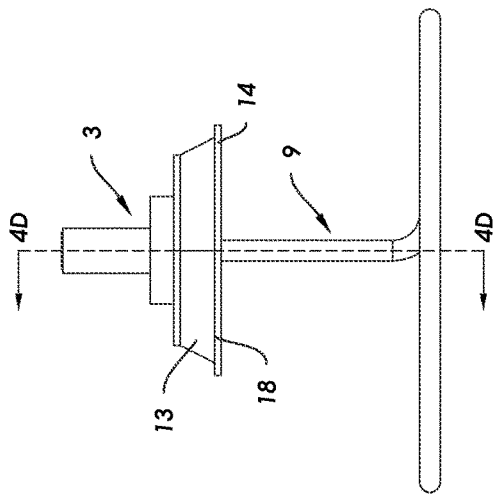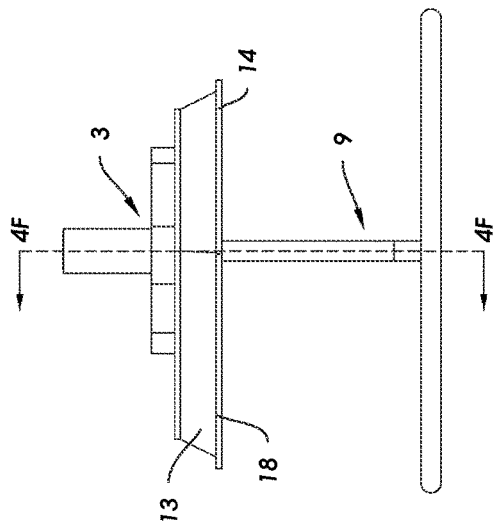

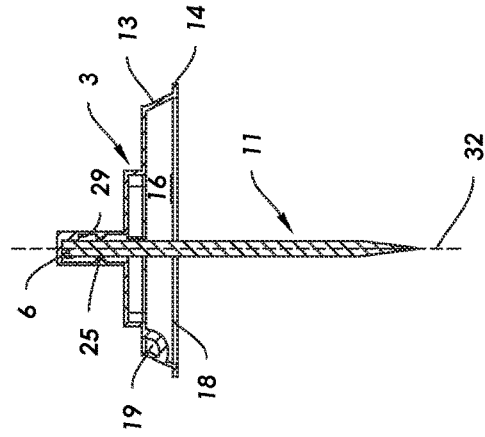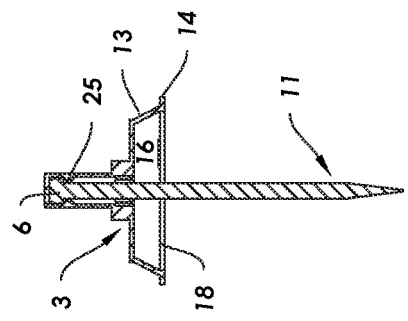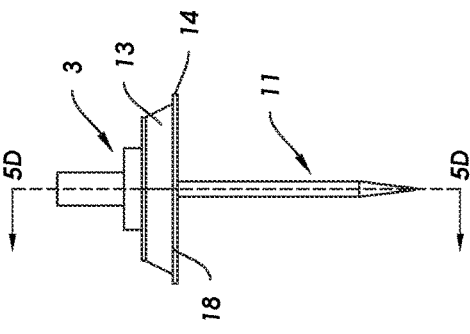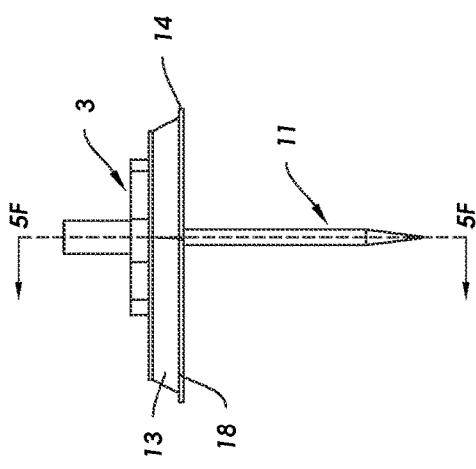

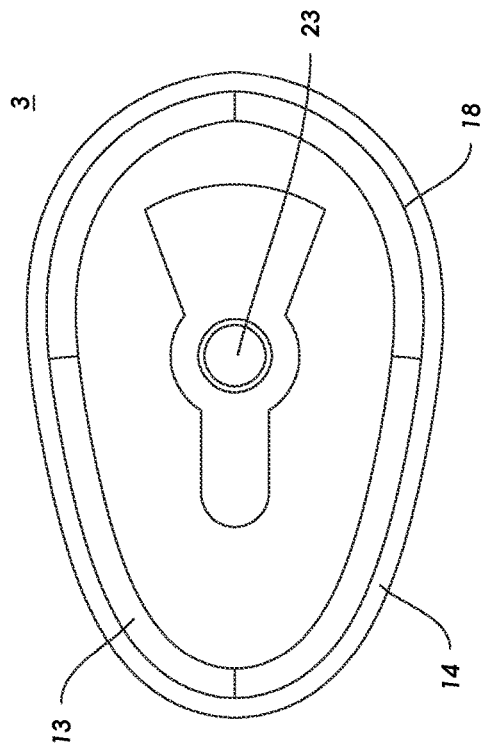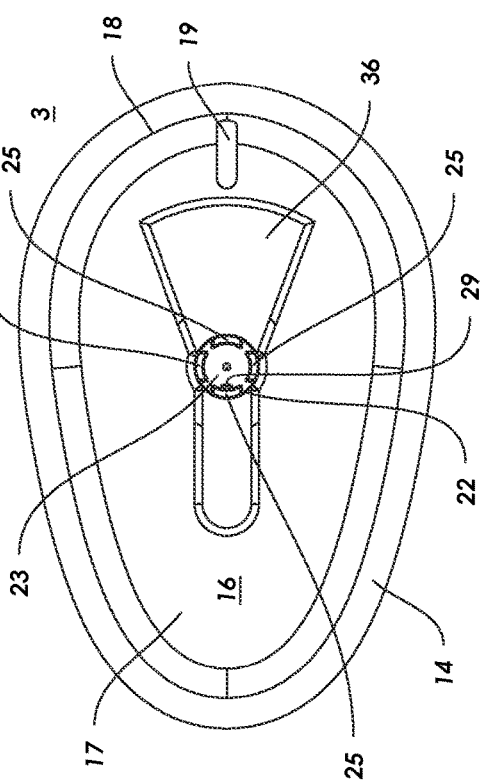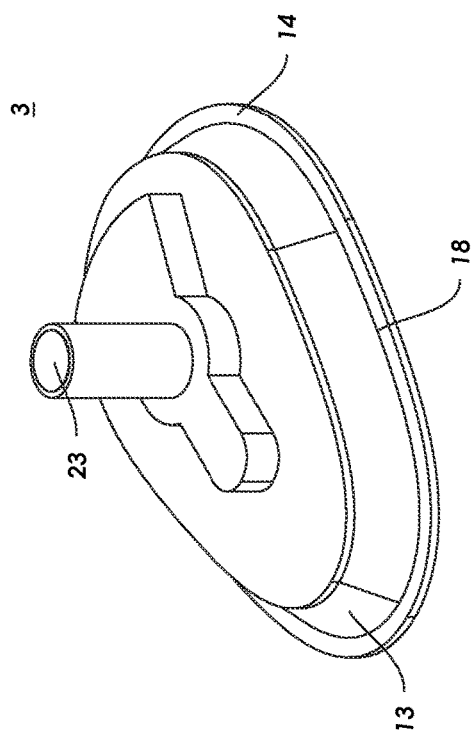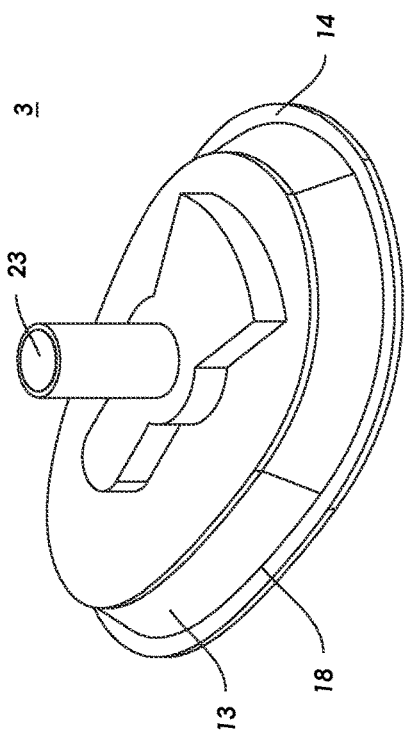

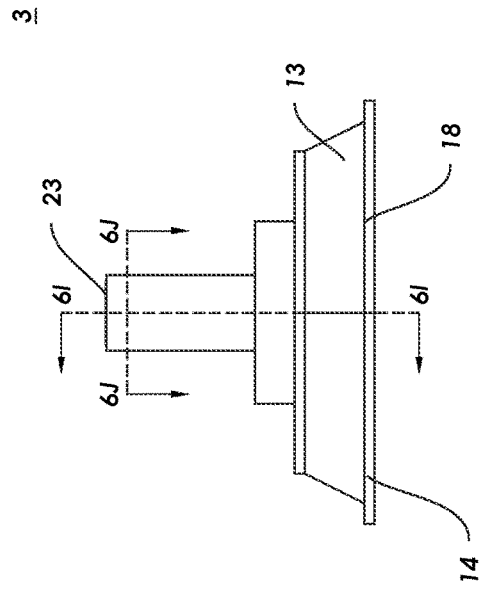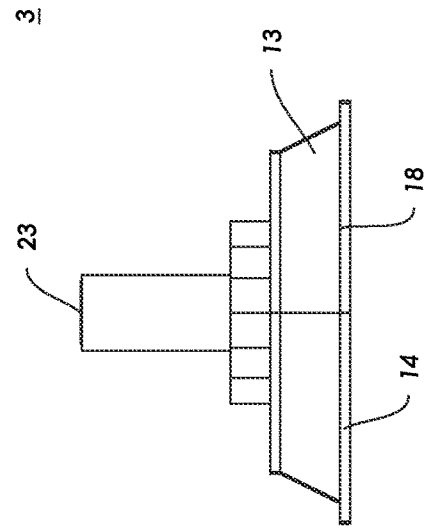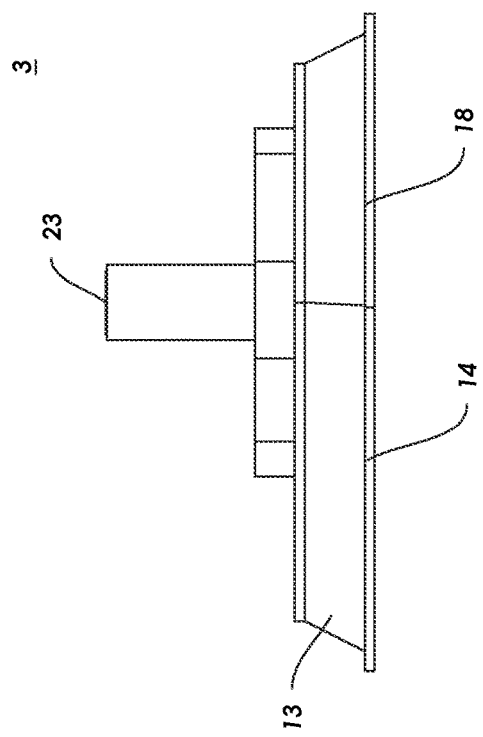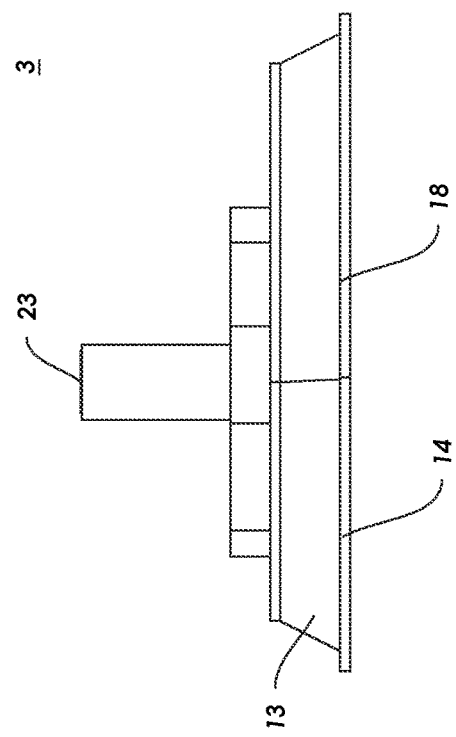

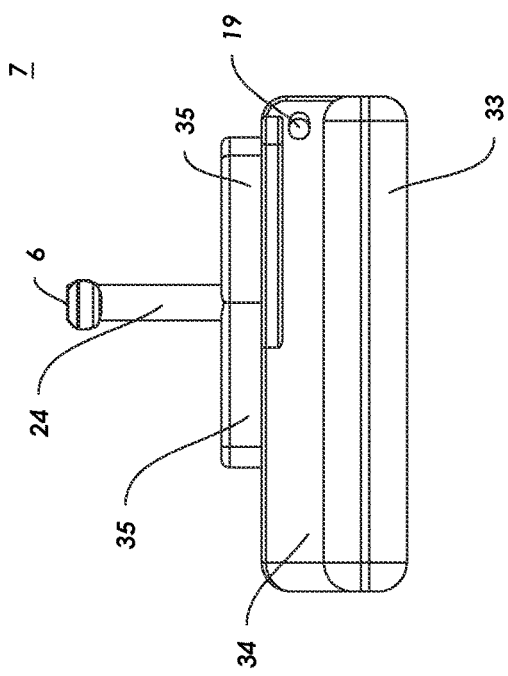
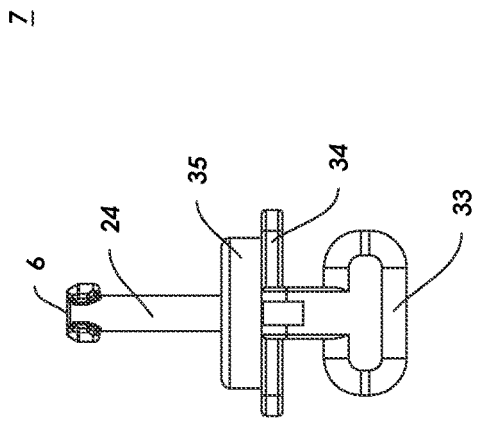
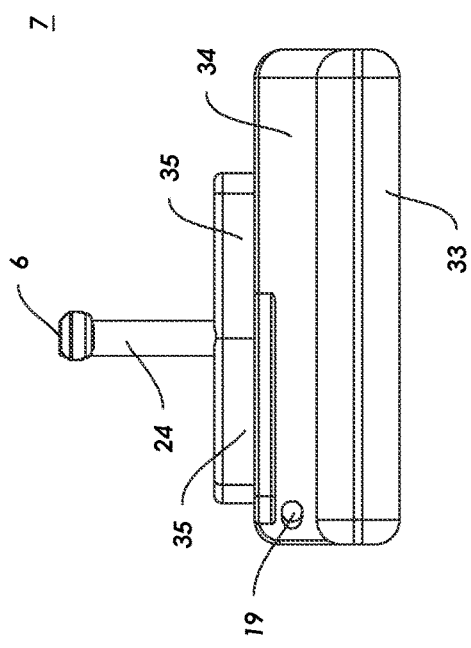
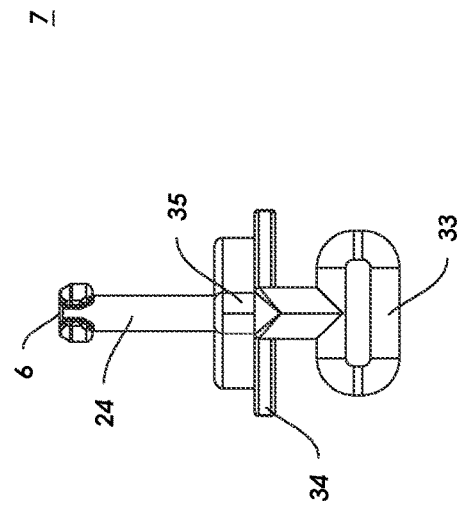

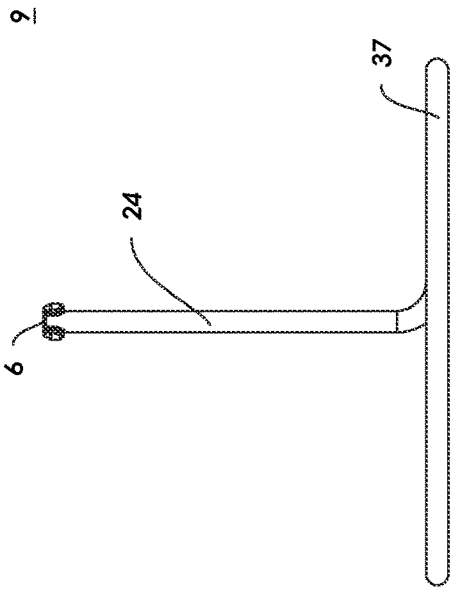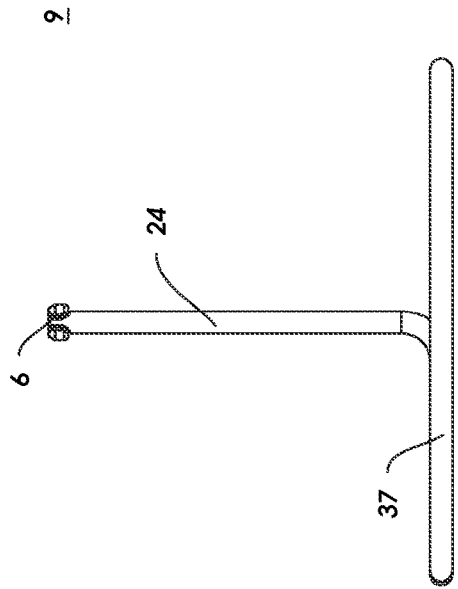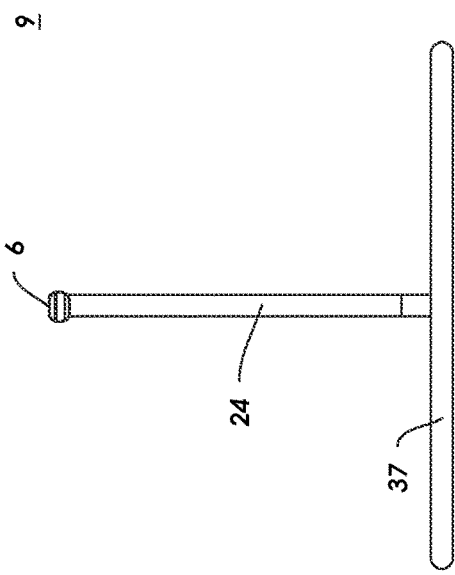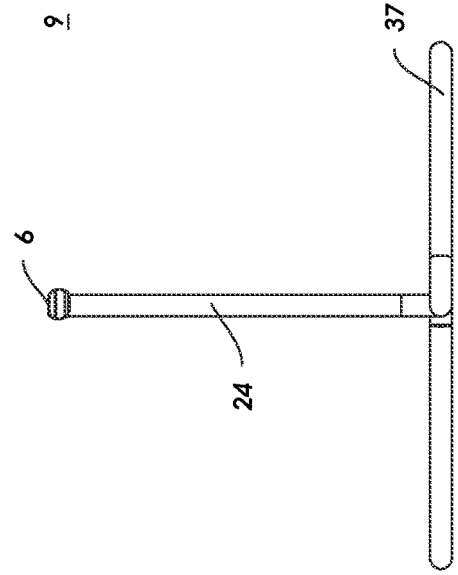

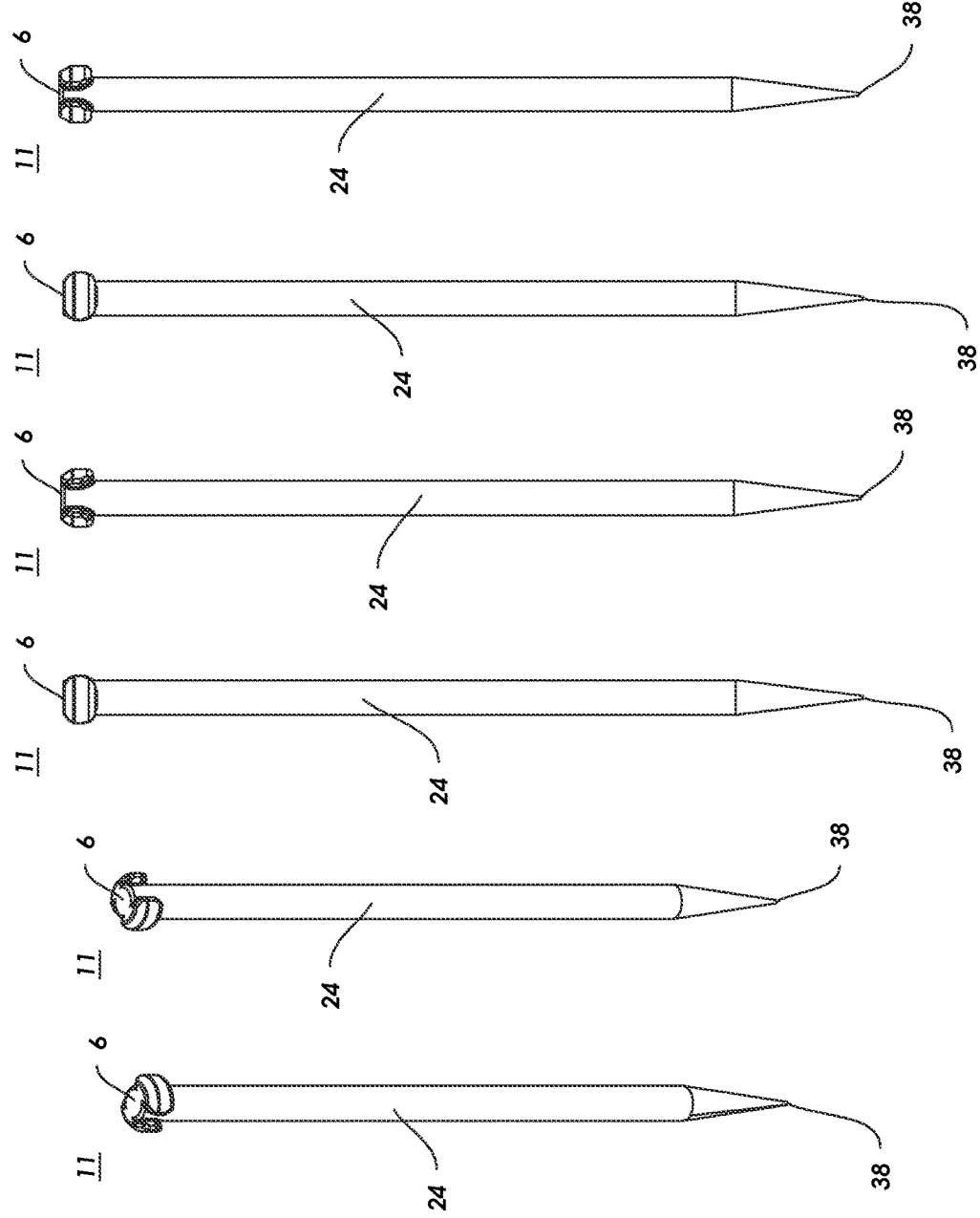

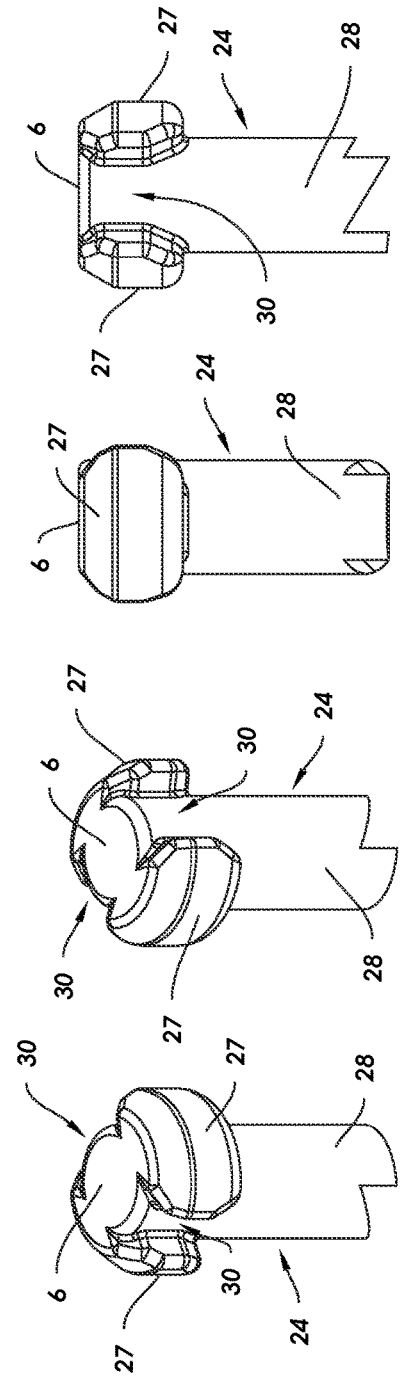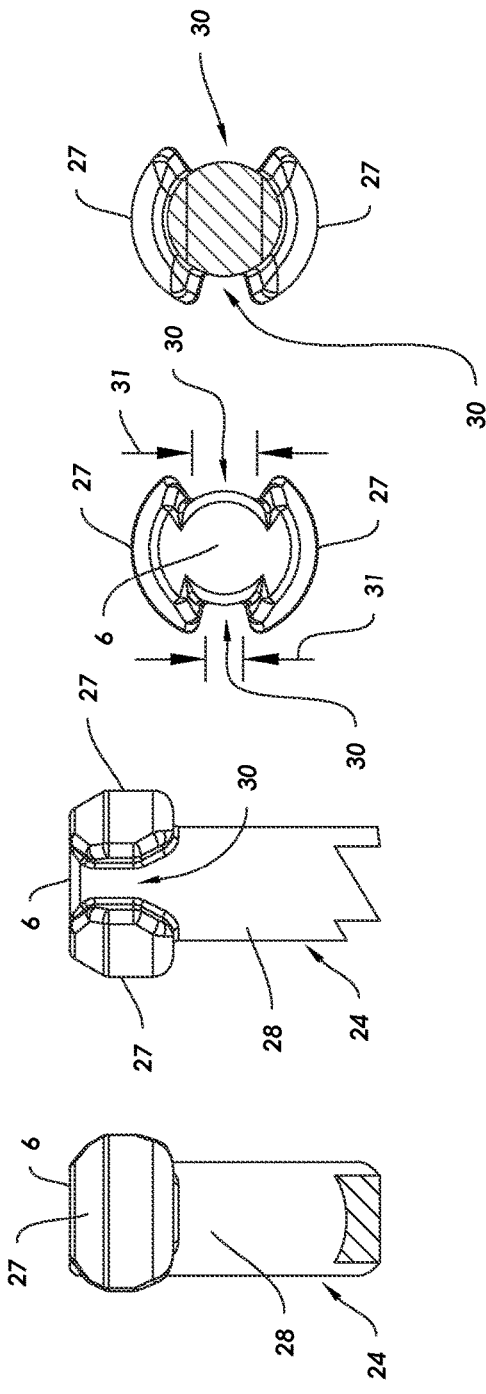

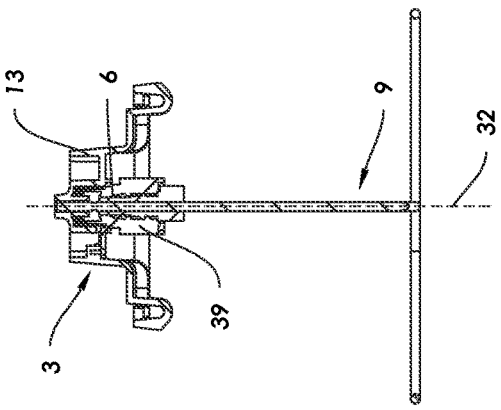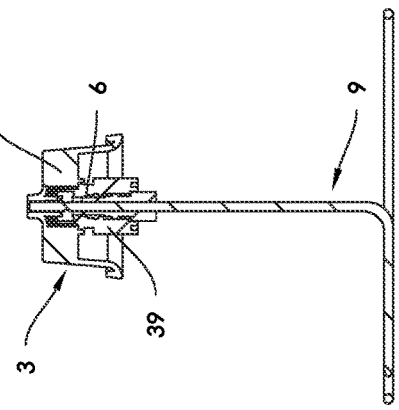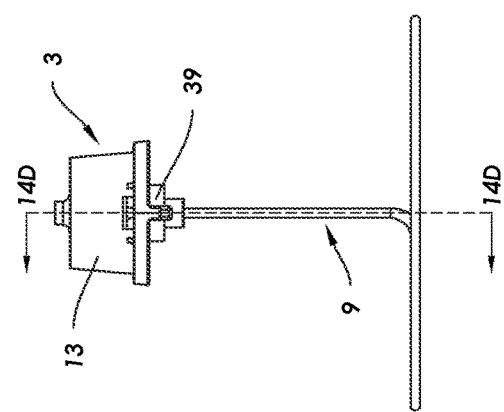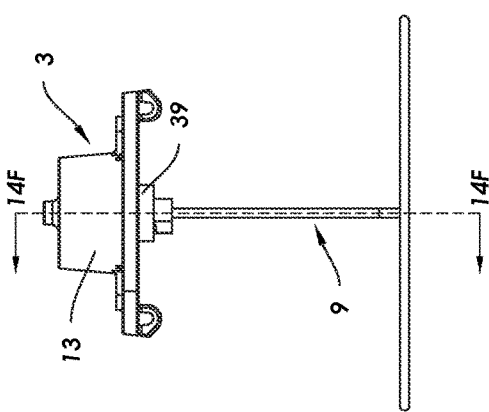

MODULAR SYSTEM FOR A DECOY

I. BACKGROUND OF THE INVENTION

Presently, waterfowl hunters may use several types of decoys to attract waterfowl into a desired hunting area. Such decoys may include floating decoys which bob on the water and move in the wind to provide realistic, lifelike motion, and field decoys which can be positioned on a stand placed on top of the ground or on a stake embedded into the ground.

The present disclosure relates to a novel all-purpose waterfowl decoy having an adapter which allows the decoy to be selectively deployed as two or more of a floating decoy, a land decoy on a stand, a staked decoy in shallow water, or a staked decoy on land, thus meeting all of the needs of a hunter as dictated by different hunting spots and the unique environmental conditions thereof.

II. SUMMARY OF THE INVENTION

A broad object of a particular embodiment of the invention can be to provide a modular system for a decoy, and methods of making and using such a modular system, whereby the modular system includes an adapter configured to couple to the decoy, the adapter comprising a connector first portion which removably couples to a connector second portion to form a connection therebetween; a keel module configured to removably couple to the adapter, the keel module comprising the connector second portion; and a stand configured to removably couple to the adapter, the stand comprising the connector second portion. As to particular embodiments, the modular system for a decoy can further include a stake configured to removably couple to the adapter, the stake comprising the connector second portion.

III. A BRIEF DESCRIPTION OF THE DRAWINGS

FIG. 3C is a first end view of the particular embodiment of the adapter and the keel module shown in FIG. 3A.

FIG. 3D is a cross-sectional view 3D-3D of the particular embodiment of the adapter and the keel module shown in FIG. 3C.

FIG. 3E is a first side view of the particular embodiment of the adapter and the keel module shown in FIG. 3A.

FIG. 3F is a cross-sectional view 3F-3F of the particular embodiment of the adapter and the keel module shown in FIG. 3E.

FIG. 4A is a perspective view of a particular embodiment of an adapter and a stand of the inventive modular system for a decoy, whereby the stand is coupled to the adapter.

FIG. 4B is an exploded view of the particular embodiment of the adapter and the stand shown in FIG. 4A.

FIG. 4C is a first end view of the particular embodiment of the adapter and the stand shown in FIG. 4A.

FIG. 4D is a cross-sectional view 4D-4D of the particular embodiment of the adapter and the stand shown in FIG. 4C.

FIG. 4E is a first side view of the particular embodiment of the adapter and the stand shown in FIG. 4A.

FIG. 4F is a cross-sectional view 4F-4F of the particular embodiment of the adapter and the stand shown in FIG. 4E.

FIG. 5C is a first end view of the particular embodiment of the adapter and the stake shown in FIG. 5A.

FIG. 5D is a cross-sectional view 5D-5D of the particular embodiment of the adapter and the stake shown in FIG. 5C.

FIG. 5E is a first side view of the particular embodiment of the adapter and the stake shown in FIG. 5A.

FIG. 5F is a cross-sectional view 5F-5F of the particular embodiment of the adapter and the stake shown in FIG. 5E.

FIG. 6A is a first perspective view of a particular embodiment of an adapter of the inventive modular system for a decoy.

FIG. 6B is a second perspective view of the particular embodiment of the adapter shown in FIG. 6A.

FIG. 6C is a top view of the particular embodiment of the adapter shown in FIG. 6A.

FIG. 6D is a bottom view of the particular embodiment of the adapter shown in FIG. 6A.

FIG. 6E is a first side view of the particular embodiment of the adapter shown in FIG. 6A.

FIG. 6F is a second side view of the particular embodiment of the adapter shown in FIG. 6A.

FIG. 6G is a first end view of the particular embodiment of the adapter shown in FIG. 6A.

FIG. 6H is a second end view of the particular embodiment of the adapter shown in FIG. 6A.

FIG. 7E is a first side view of the particular embodiment of the keel module shown in FIG. 7A.

FIG. 7F is a second side view of the particular embodiment of the keel module shown in FIG. 7A.

FIG. 7G is a first end view of the particular embodiment of the keel module shown in FIG. 7A.

FIG. 7H is a second end view of the particular embodiment of the keel module shown in FIG. 7A.

FIG. 8E is a first side view of the particular embodiment of the stand shown in FIG. 8A.

FIG. 8F is a second side view of the particular embodiment of the stand shown in FIG. 8A.

FIG. 8G is a first end view of the particular embodiment of the stand shown in FIG. 8A.

FIG. 8H is a second end view of the particular embodiment of the stand shown in FIG. 8A.

FIG. 9A is a first perspective view of a particular embodiment of a stake of the inventive modular system for a decoy.

FIG. 9B is a second perspective view of the particular embodiment of the stake shown in FIG. 9A.

FIG. 9C is a top view of the particular embodiment of the stake shown in FIG. 9A.

FIG. 9D is a bottom view of the particular embodiment of the stake shown in FIG. 9A.

FIG. 9E is a first side view of the particular embodiment of the stake shown in FIG. 9A.

FIG. 9F is a second side view of the particular embodiment of the stake shown in FIG. 9A.

FIG. 9G is a first end view of the particular embodiment of the stake shown in FIG. 9A.

FIG. 9H is a second end view of the particular embodiment of the stake shown in FIG. 9A.

FIG. 10A is an enlarged first perspective view of a particular embodiment of a connector second portion of the inventive modular system for a decoy.

FIG. 10B is an enlarged second perspective view of the particular embodiment of the connector second portion shown in FIG. 10A.

FIG. 10C is an enlarged top view of the particular embodiment of the connector second portion shown in FIG. 10A.

FIG. 10D is an enlarged bottom view of the particular embodiment of the connector second portion shown in FIG. 10A.

FIG. 10E is an enlarged first side view of the particular embodiment of the connector second portion shown in FIG. 10A.

FIG. 10F is an enlarged second side view of the particular embodiment of the connector second portion shown in FIG. 10A.

FIG. 10G is an enlarged first end view of the particular embodiment of the connector second portion shown in FIG. 10A.

FIG. 10H is an enlarged second end view of the particular embodiment of the connector second portion shown in FIG. 10A.

FIG. 14C is a first end view of the particular embodiment of the adapter, the stand, and the quick connect element shown in FIG. 14A.

FIG. 14D is a cross-sectional view 14D-14D of the particular embodiment of the adapter, the stand, and the quick connect element shown in FIG. 14C.

FIG. 14E is a first side view of the particular embodiment of the adapter, the stand, and the quick connect element shown in FIG. 14A.

FIG. 14F is a cross-sectional view 14F-14F of the particular embodiment of the adapter, the stand, and the quick connect element shown in FIG. 14E.

IV. DETAILED DESCRIPTION OF THE PREFERRED EMBODIMENTS

Figure 1:
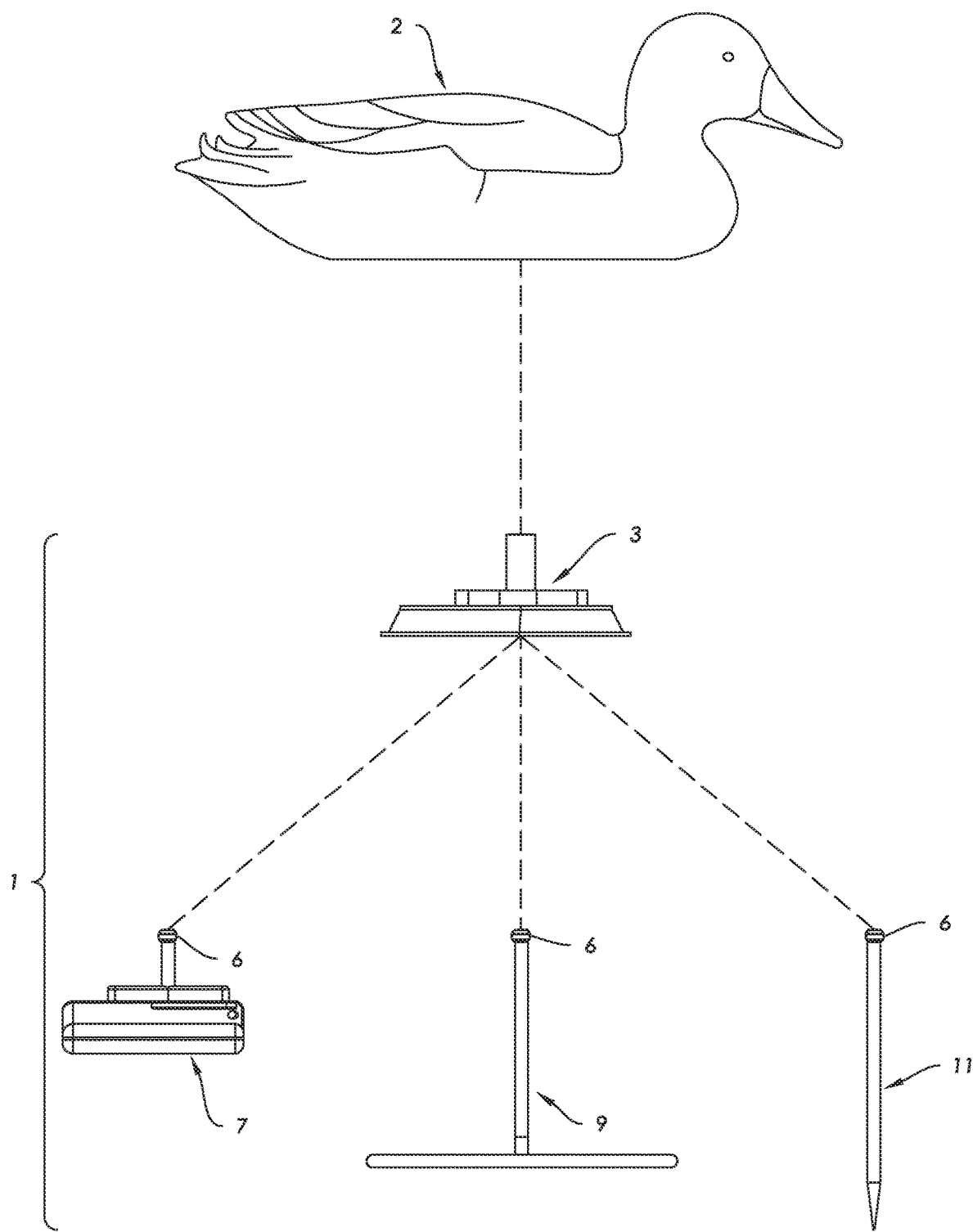
FIG. 1 is an illustration of a particular embodiment of the inventive modular system for a decoy including (i) an adapter configured to couple to the decoy, and (ii) a keel module, a stand, and a stake, each removably couplable to the adapter, allowing differential support of the decoy.
Figure 2A:
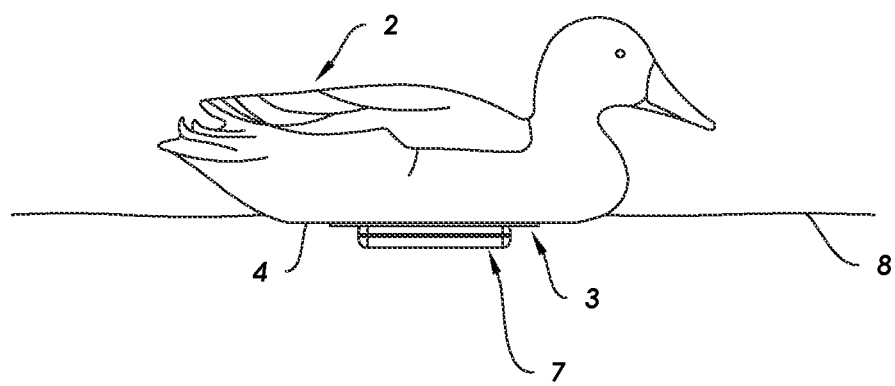
FIG. 2A is an illustration of a method of using a particular embodiment of the inventive modular system for a decoy, whereby a keel module is shown coupled to the decoy via an adapter to support the decoy in water.
Figure 2B:
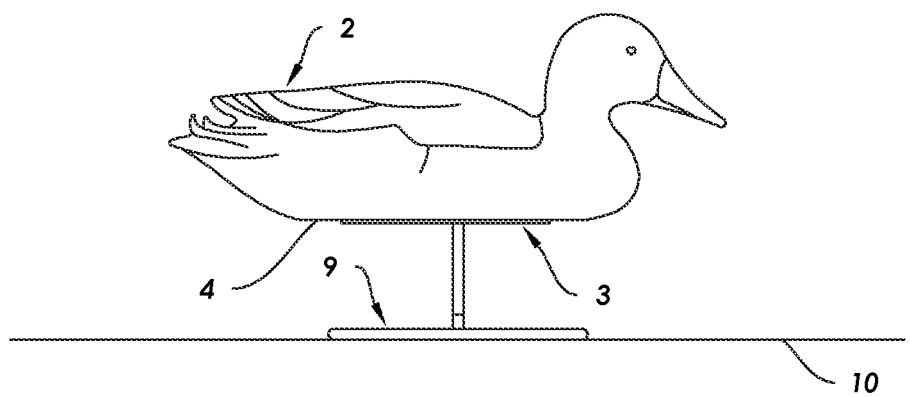
FIG. 2B is an illustration of a method of using a particular embodiment of the inventive modular system for a decoy, whereby a stand is shown coupled to the decoy via an adapter to support the decoy on the ground.
Figure 2C:
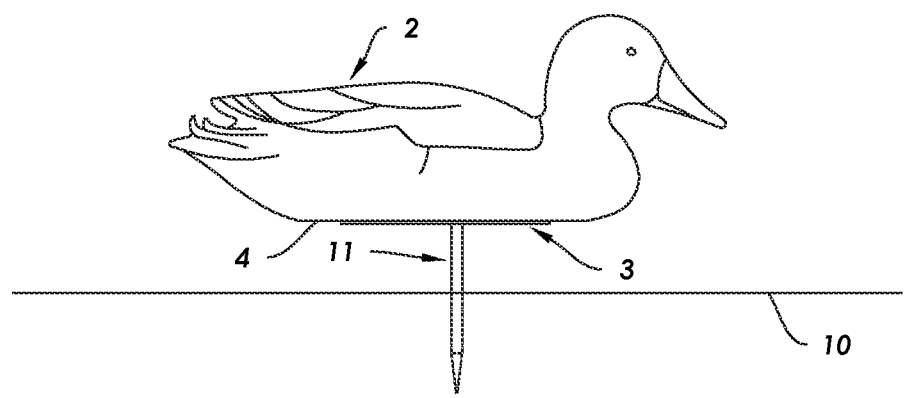
FIG. 2C is an illustration of a method of using a particular embodiment of the inventive modular system for a decoy, whereby a stake is shown coupled to the decoy via an adapter to support the decoy in the ground.
Figure 3B:
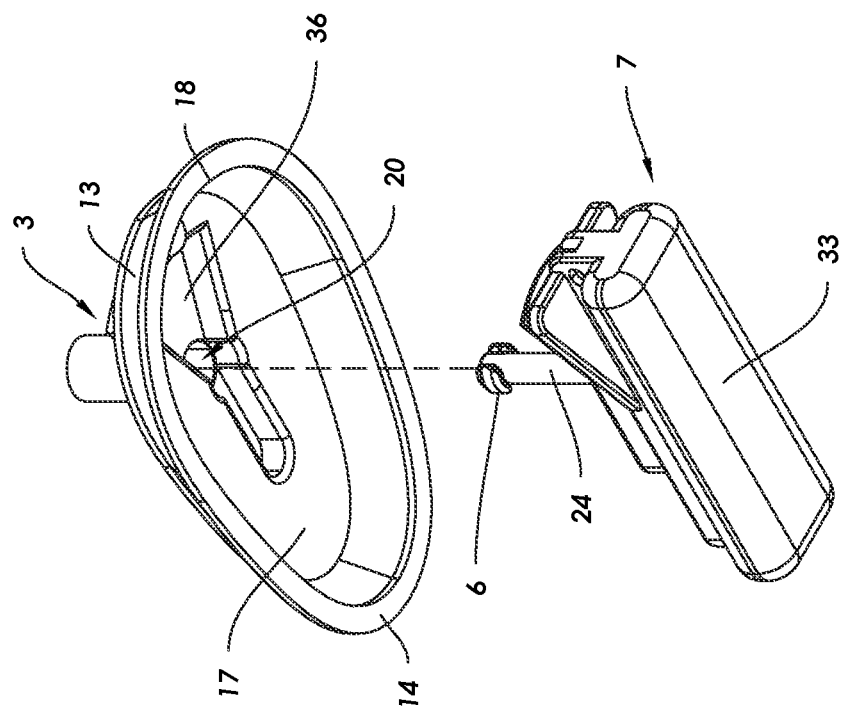
FIG. 3B is an exploded view of the particular embodiment of the adapter and the keel module shown in FIG. 3A.
Figure 3A:
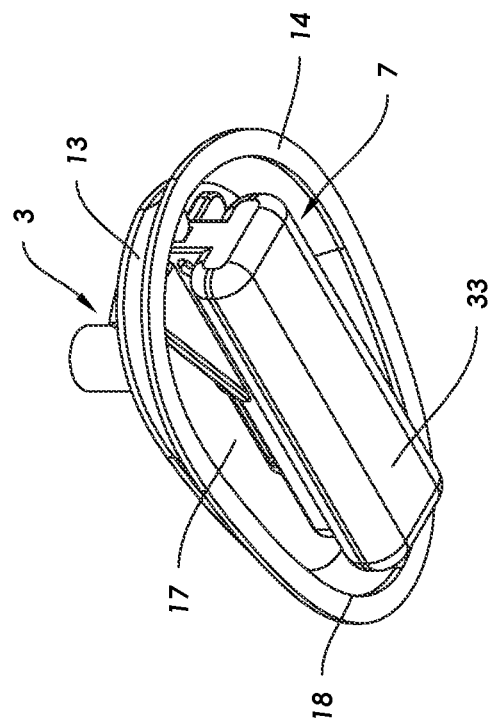
FIG. 3A is a perspective view of a particular embodiment of an adapter and a keel module of the inventive modular system for a decoy, whereby the keel module is coupled to the adapter.
Figure 5B:
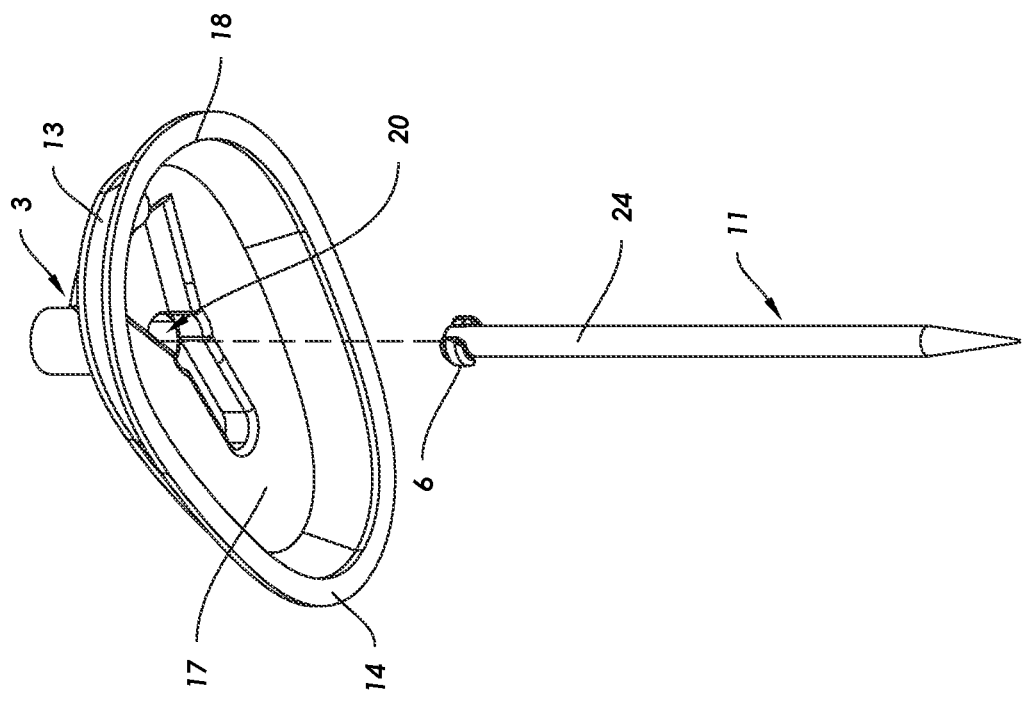
FIG. 5B is an exploded view of the particular embodiment of the adapter and the stake shown in FIG. 5A.
Figure 5A:
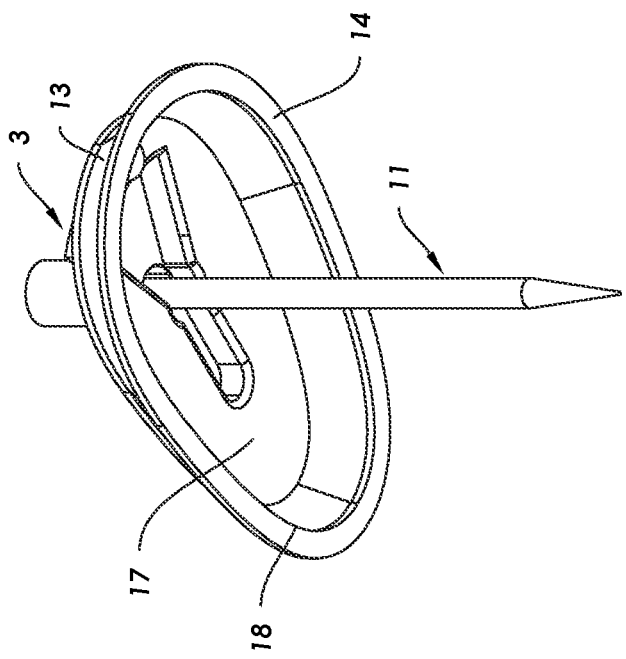
FIG. 5A is a perspective view of a particular embodiment of an adapter and a stake of the inventive modular system for a decoy, whereby the stake is coupled to the adapter.
Figure 6J:
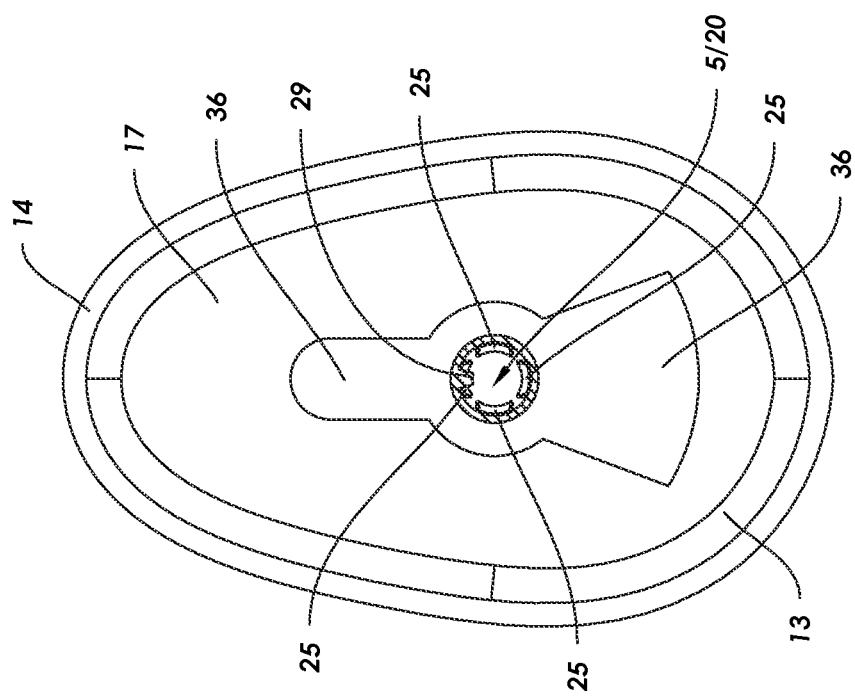
FIG. 6J is a cross-sectional view 6J-6J of the particular embodiment of the adapter shown in FIG. 6G.
Figure 6I:
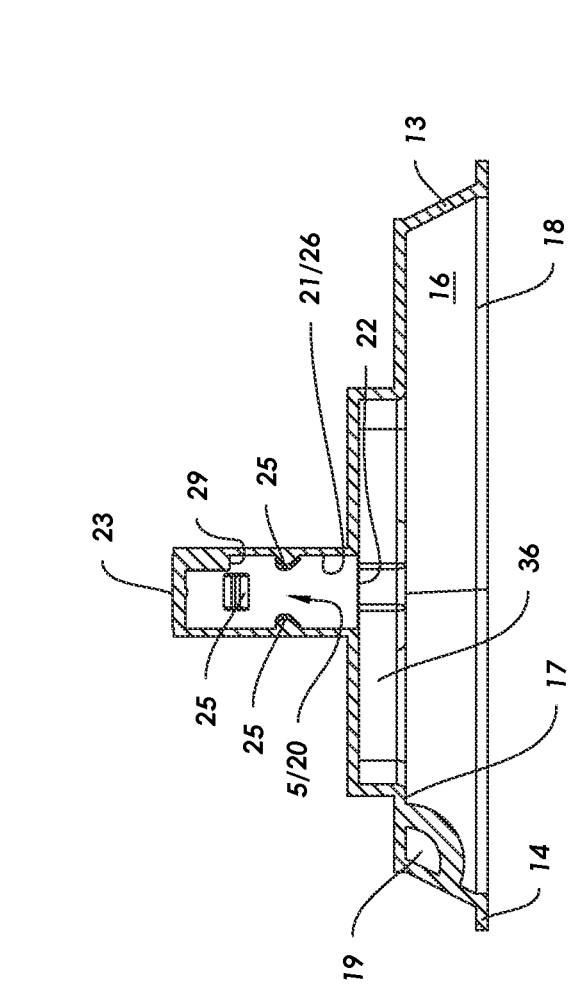
FIG. 6I is a cross-sectional view 6I-6I of the particular embodiment of the adapter shown in FIG. 6G.
Figure 7C:
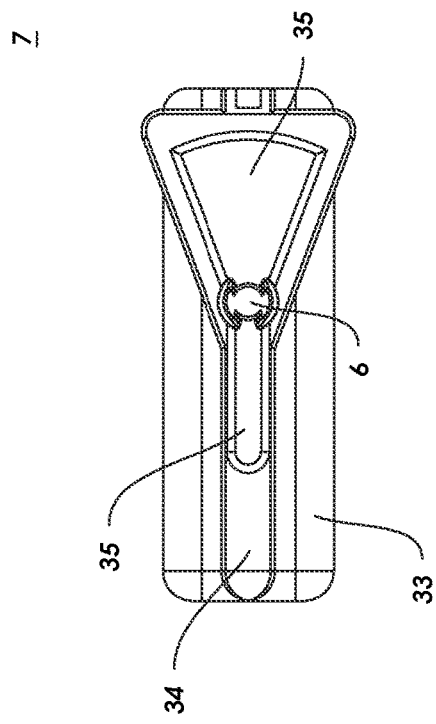
FIG. 7C is a top view of the particular embodiment of the keel module shown in FIG. 7A.
Figure 7D:
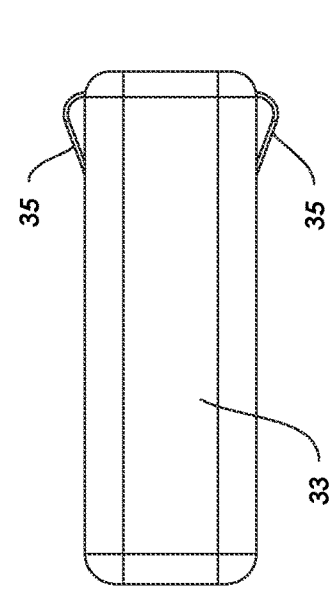
FIG. 7D is a bottom view of the particular embodiment of the keel module shown in FIG. 7A.
Figure 7A:
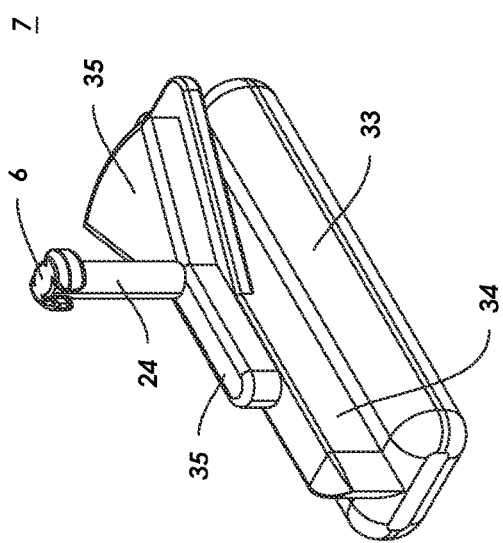
FIG. 7A is a first perspective view of a particular embodiment of a keel module of the inventive modular system for a decoy.
Figure 7B:
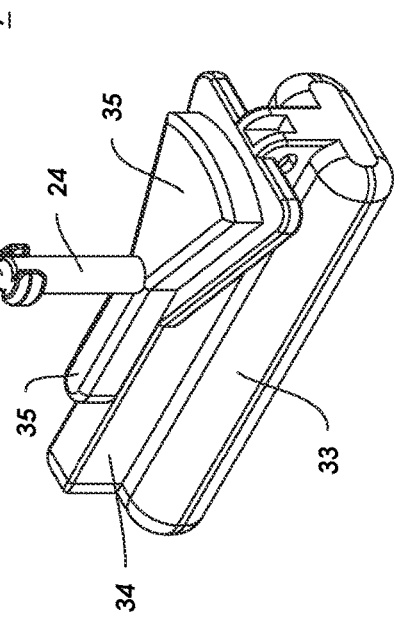
FIG. 7B is a second perspective view of the particular embodiment of the keel module shown in FIG. 7A.
Figure 8A:
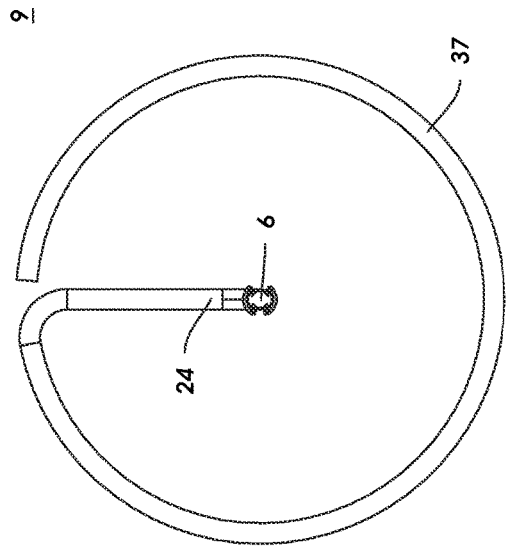
FIG. 8A is a first perspective view of a particular embodiment of a stand of the inventive modular system for a decoy.
Figure 8B:
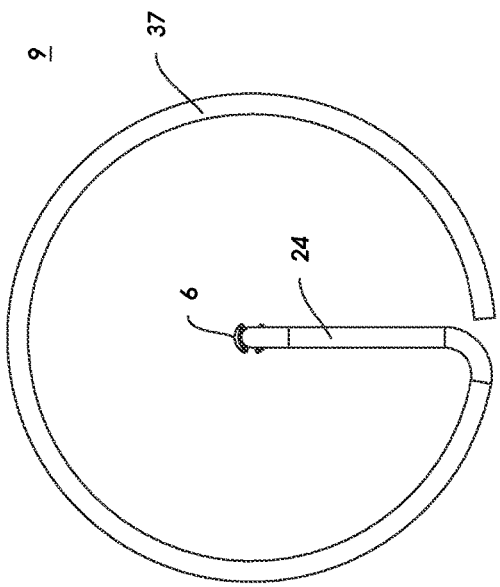
FIG. 8B is a second perspective view of the particular embodiment of the stand shown in FIG. 8A.
Figure 8C:
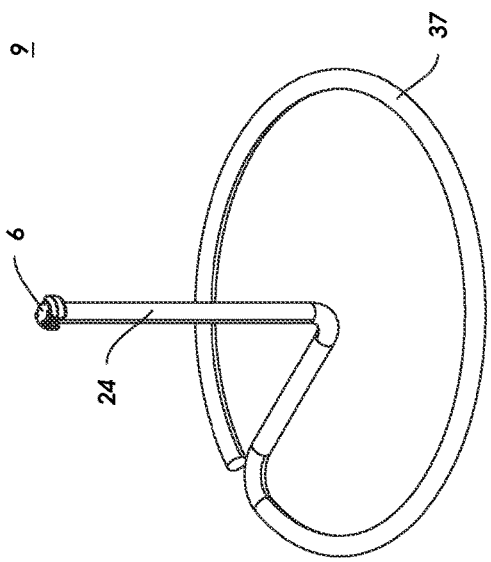
FIG. 8C is a top view of the particular embodiment of the stand shown in FIG. 8A.
Figure 8D:
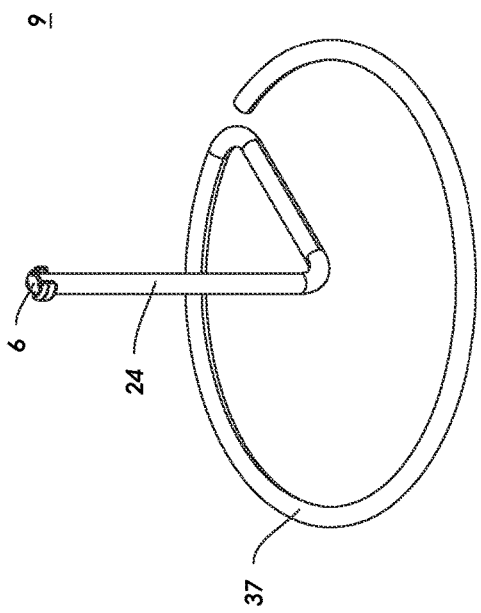
FIG. 8D is a bottom view of the particular embodiment of the stand shown in FIG. 8A.

Now referring primarily to FIGS. 1, 2A, 2B, 2C, and 12, which illustrate methods of using a particular embodiment of the inventive modular system (1) for a decoy (2), whereby said modular system (1) includes an adapter (3) configured to couple to a bottom (4) of the decoy (2). The adapter (3) includes a connector first portion (5) which removably matingly engages with a connector second portion (6) to form a connection therebetween. Following, a decoy support configured as a keel module (7) which includes the connector second portion (6) can be removably coupled to the adapter (3) and correspondingly, the decoy (2); as such, the decoy (2) can be supported in water (8) by the keel module (7). Additionally, a decoy support configured as a stand (9) which includes the connector second portion (6) can be removably coupled to the adapter (3) and correspondingly, the decoy (2); as such, the decoy (2) can be supported on the ground (10) by the stand (9). Moreover, as to particular embodiments, a decoy support configured as a stake (11) which includes the connector second portion (6) can be removably coupled to the adapter (3) and correspondingly, the decoy (2); as such, the decoy (2) can be supported in the ground (10) by the stake (11). Thus, the instant modular system (1) provides two or more of a keel module (7), a stand (9), and a stake (11) which can be easily, quickly, and repeatably attached to or removed from the adapter (3) and accordingly, the decoy (2), facilitating the use of a single decoy (2) in multiple environments. Furthermore, a decoy (2) fitted with only the adapter (3) (and without the keel module (7), the stand (9), or the stake (11)) can act as a shell or resting decoy (2), such as on the ground (10) or on ice. To reiterate, the inventive modular system (1) for a decoy (2) can facilitate multiple configurations of the decoy (2) such that one decoy (2) can be a floater decoy (2), a full body decoy (2), and a shell or resting decoy (2).

As used herein, the term "removable" means capable of being relatively easily separated without destroying the integrity of the separated pieces. For example, each of the keel module (7), the stand (9), and the stake (11) can be removably coupled to the adapter (3) and as such, can be relatively easily separated from the adapter (3) without destroying the integrity of the keel module (7), the stand (9), the stake (11), or the adapter (3).

The instant modular system (1) can be used with any of a wide variety of decoys (2) and in particular, with waterfowl decoys (2), such as a duck decoy, a goose decoy, a swan decoy, etc. The decoy (2) can be provided in any of a numerous and wide variety of desired waterfowl shapes, and can have a buoyant body including a front, a rear, opposed sides, and a substantially flat bottom (4). The front, rear, and opposed sides may all curve inward adjacent the bottom (4) to provide the decoy (2) with a realistic, lifelike form when floating on water (8), standing in shallow water (8), standing on the ground (10), or resting on the ground (10). The decoy (2) can be made from any appropriate method, such as injection molding, rotomolding, blow molding, additive printing, casting, machining, etc., and any suitable material including but not necessarily limited to: plastic, resin, polyethylene (PE), high-density polyethylene (HDPE), medium-density polyethylene (MDPE), low-density polyethylene (LDPE), linear low-density polyethylene (LLDPE), nylon (PA), polypropylene (PP), polystyrene (PS), polyurethane (PU), KOSTRATE®, K-Resign SBC, foam, ethylene-vinyl acetate (EVA) foam, polyurethane (PU) foam, expanded thermoplastic polyurethane (ETPU) foam, expanded polypropylene (EPP) foam, composite, wood, or the like.

Now referring primarily to FIGS. 3A through 6J, and 13A through 15H, the instant modular system (1) for a decoy (2) includes an adapter (3) configured to couple to a bottom (4) of the decoy (2). As to particular embodiments, the adapter (3) can be integrated with the decoy (2), meaning that the decoy (2) and the adapter (3) can be provided as a single or one-piece or monolithic construct. As to other particular embodiments, the adapter (3) can be (i) discrete from and (ii) couplable to the decoy (2).

Figure 11:
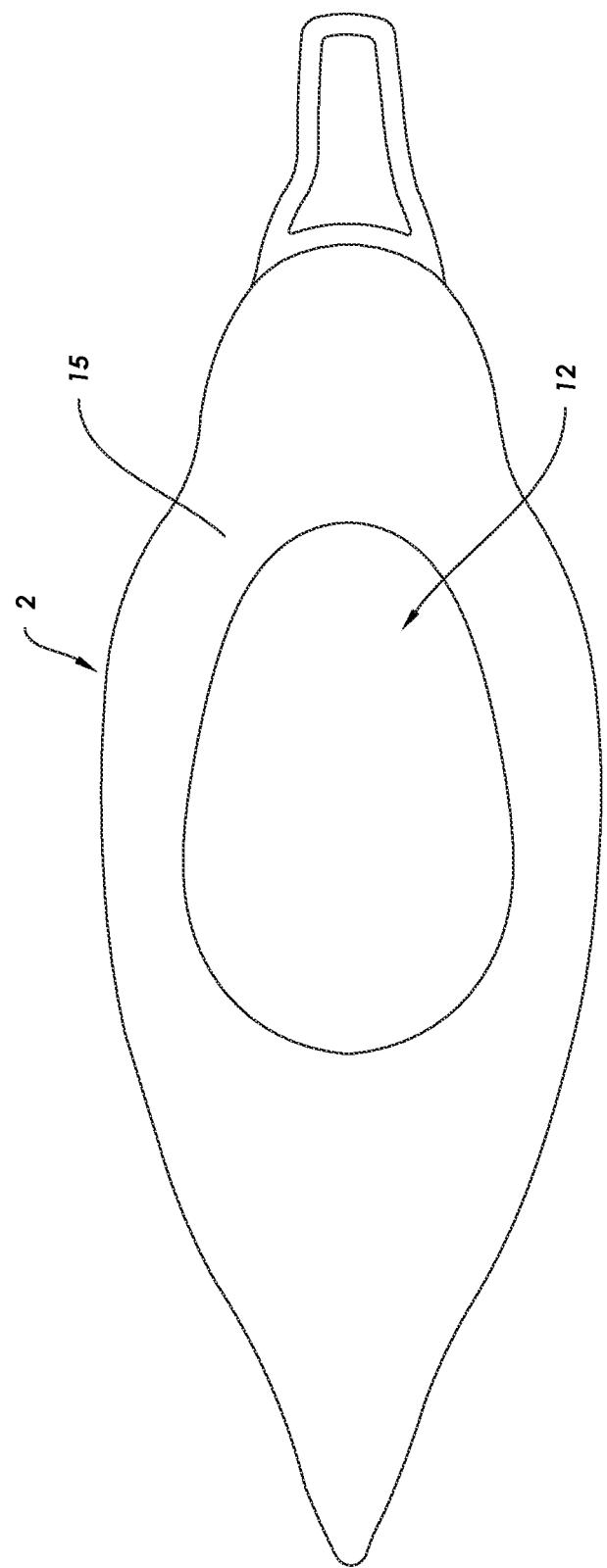
FIG. 11 is a bottom view of a particular embodiment of a decoy having a receptacle for use with the inventive modular system.
Figure 12:
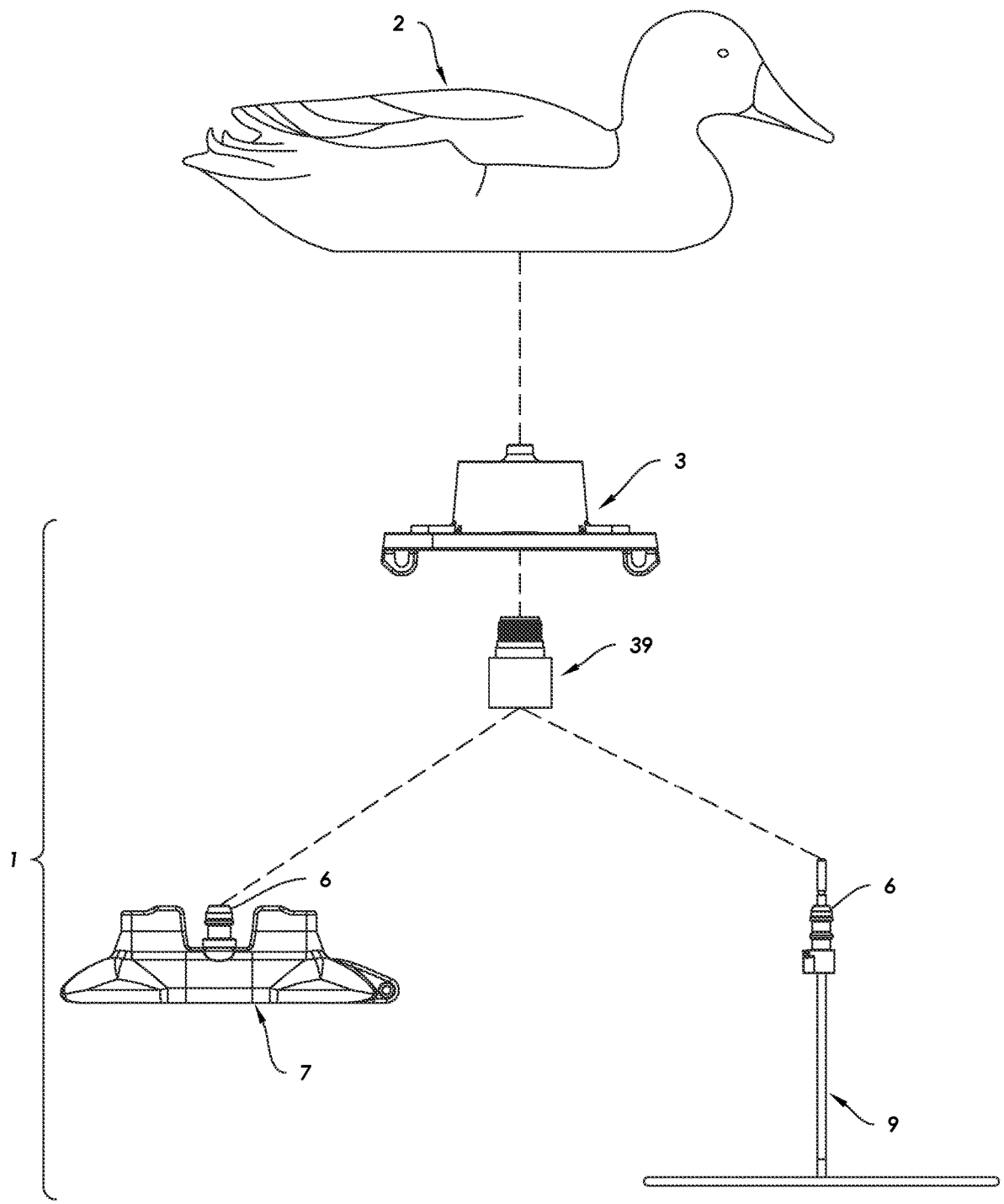
FIG. 12 is an illustration of a particular embodiment of the inventive modular system for a decoy including (i) an adapter configured to couple to the decoy, and (ii) a keel module and a stand, each removably couplable to the adapter, allowing differential support of the decoy.
Figure 13B:
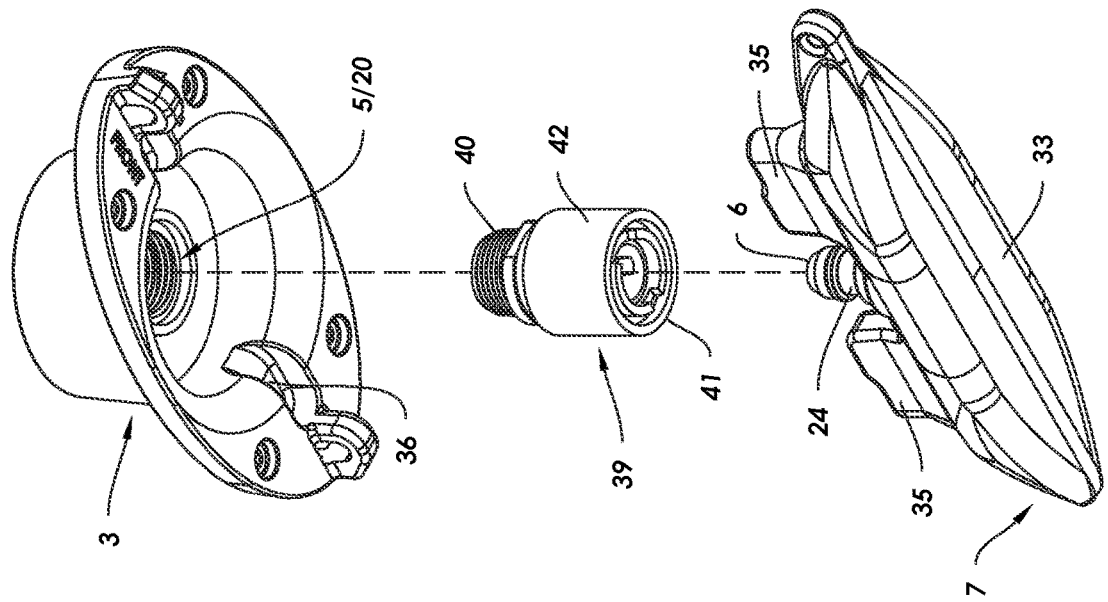
FIG. 13B is an exploded view of the particular embodiment of the adapter, the keel module, and the quick connect element shown in FIG. 13A.
Figure 13A:
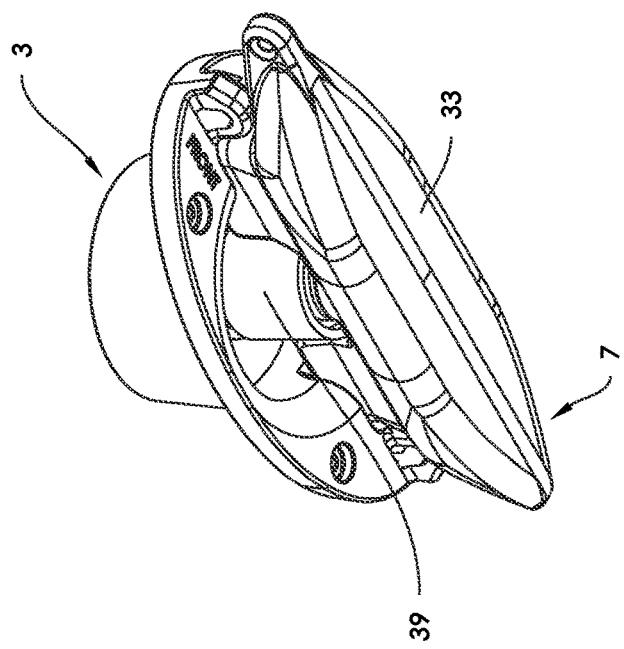
FIG. 13A is a perspective view of a particular embodiment of an adapter and a keel module of the inventive modular system for a decoy, whereby the keel module is coupled to the adapter via a quick connect element.
Figure 13C:
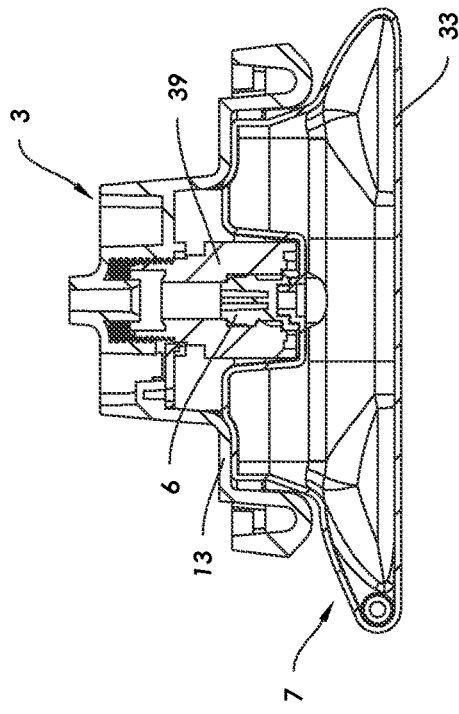
FIG. 13C is a first end view of the particular embodiment of the adapter, the keel module, and the quick connect element shown in FIG. 13A.
Figure 13D:
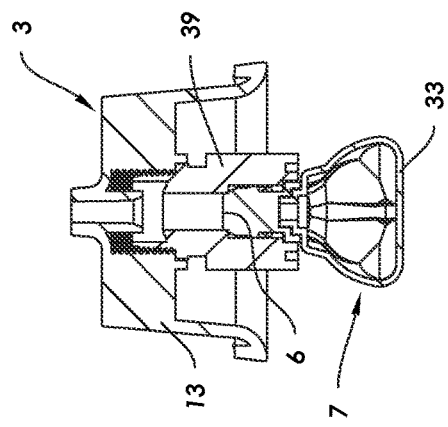
FIG. 13D is a cross-sectional view 13D-13D of the particular embodiment of the adapter, the keel module, and the quick connect element shown in FIG. 13C.
Figure 13E:
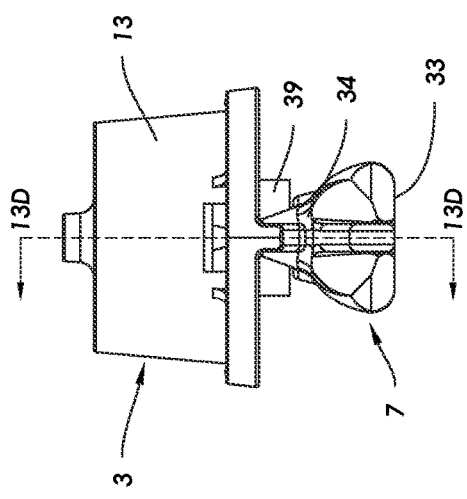
FIG. 13E is a first side view of the particular embodiment of the adapter, the keel module, and the quick connect element shown in FIG. 13A.
Figure 13F:
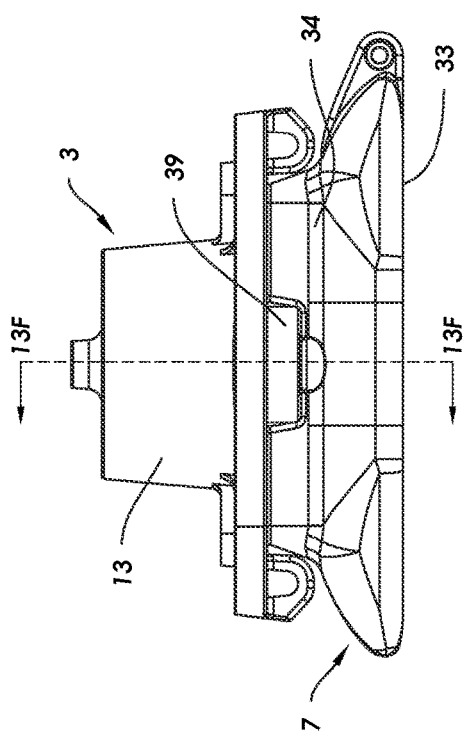
FIG. 13F is a cross-sectional view 13F-13F of the particular embodiment of the adapter, the keel module, and the quick connect element shown in FIG. 13E.
Figure 14B:
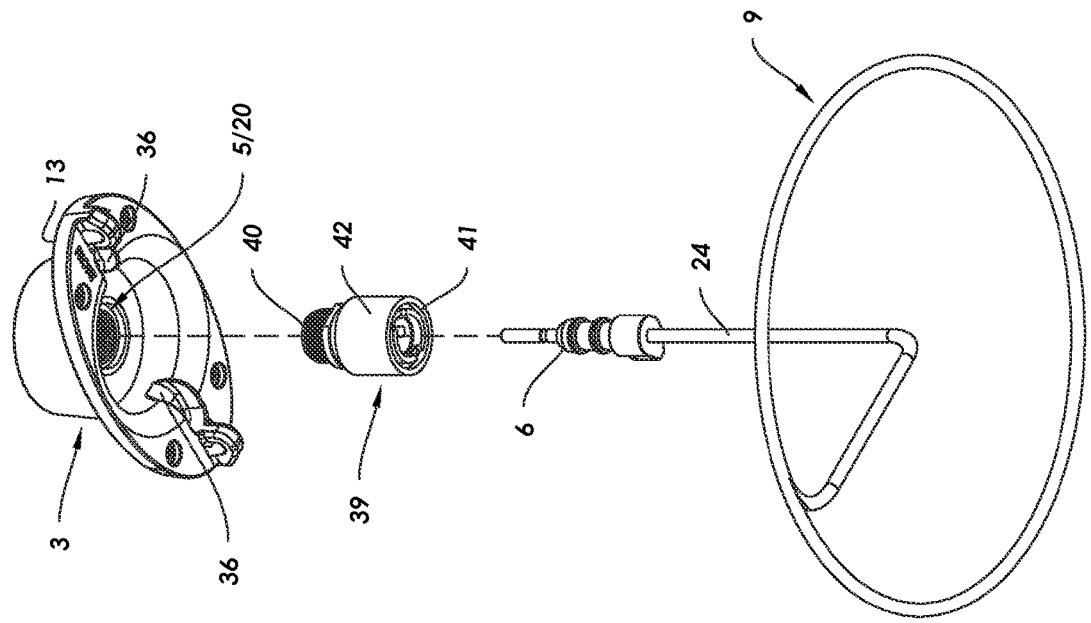
FIG. 14B is an exploded view of the particular embodiment of the adapter, the stand, and the quick connect element shown in FIG. 14A.
Figure 14A:
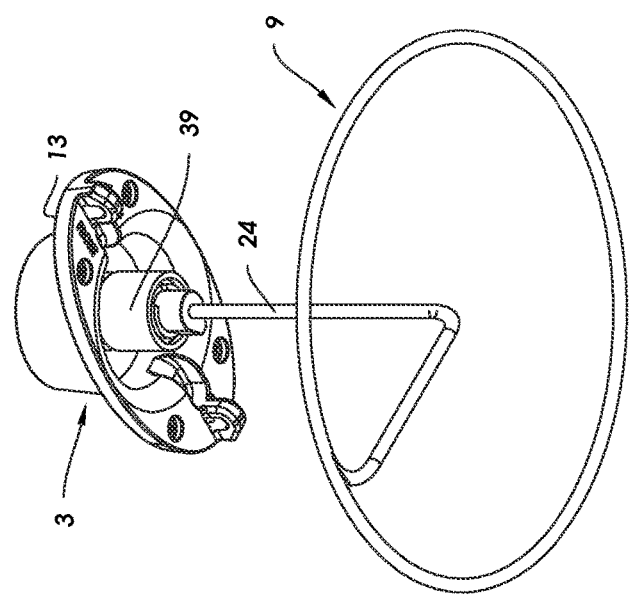
FIG. 14A is a perspective view of a particular embodiment of an adapter and a stand of the inventive modular system for a decoy, whereby the stand is coupled to the adapter via a quick connect element.
Figure 15C:
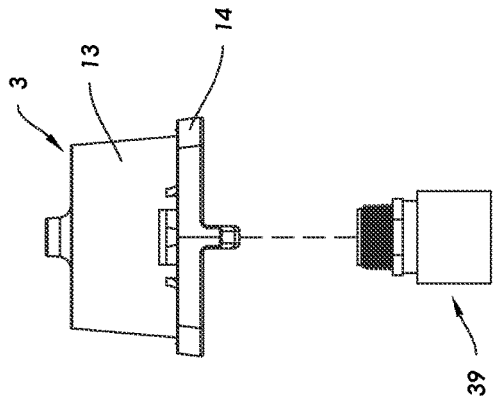
FIG. 15C is an exploded second end view of the particular embodiment of the adapter and the quick connect element shown in FIG. 15A.
Figure 15D:
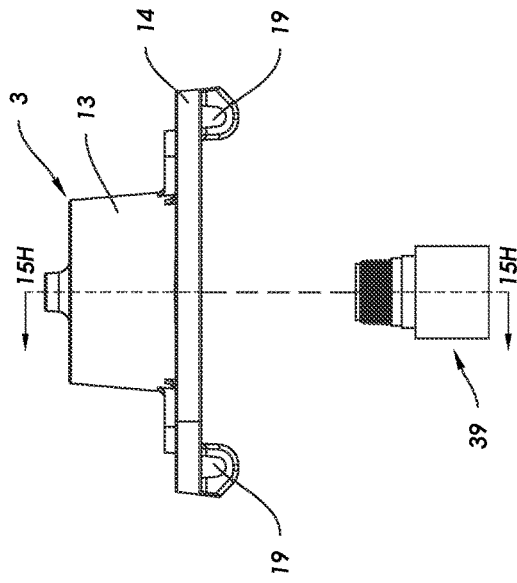
FIG. 15D is an exploded first side view of the particular embodiment of the adapter and the quick connect element shown in FIG. 15A.
Figure 15A:
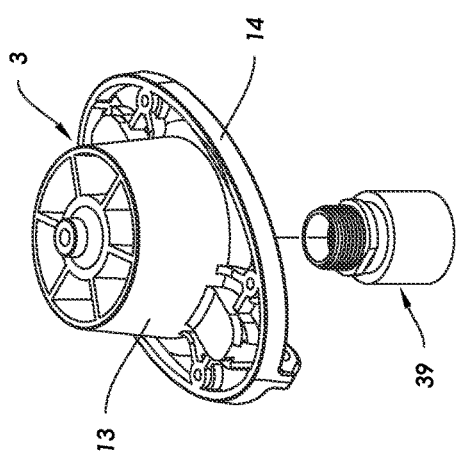
FIG. 15A is an exploded perspective view of a particular embodiment of an adapter and a quick connect element of the inventive modular system for a decoy.
Figure 15B:
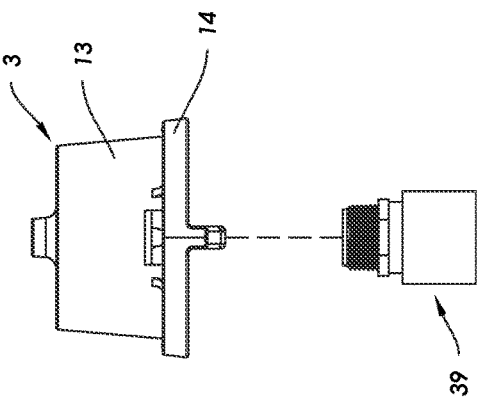
FIG. 15B is an exploded first end view of the particular embodiment of the adapter and the quick connect element shown in FIG. 15A.
Figure 15E:
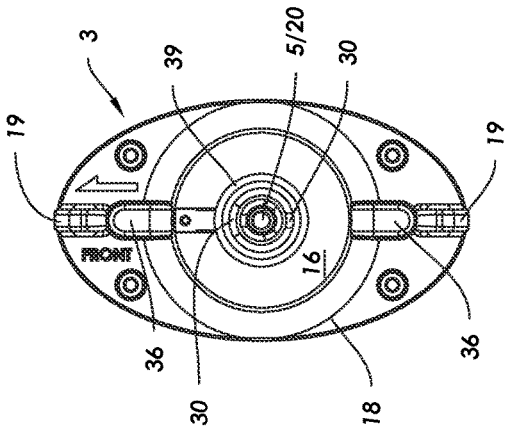
FIG. 15E is an exploded second side view of the particular embodiment of the adapter and the quick connect element shown in FIG. 15A.
Figure 15G:
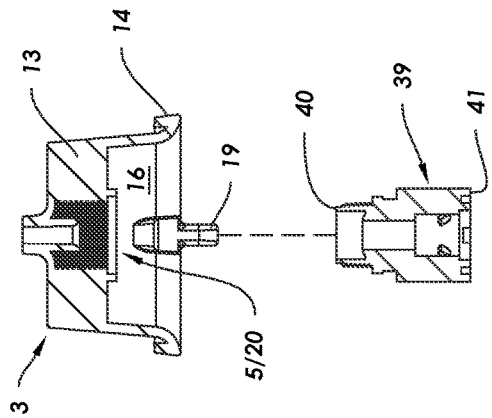
FIG. 15G is an exploded bottom view of the particular embodiment of the adapter and the quick connect element shown in FIG. 15A.
Figure 15F:
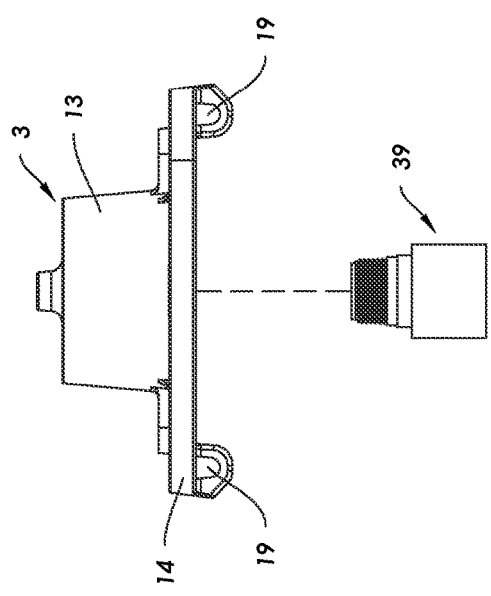
FIG. 15F is an exploded top view of the particular embodiment of the adapter and the quick connect element shown in FIG. 15A.
Figure 15H:
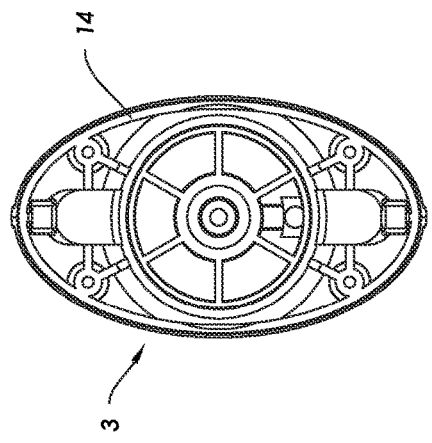
FIG. 15H is a cross-sectional view 15H-15H of the particular embodiment of the adapter and the quick connect element shown in FIG. 15D.
Figure 16A:
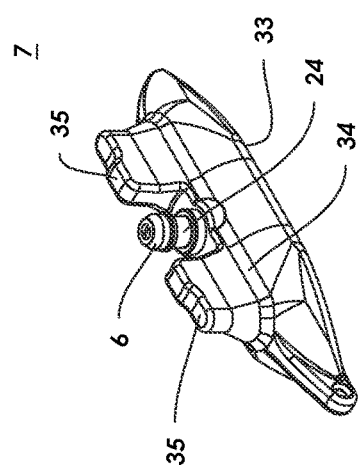
FIG. 16A is a perspective view of a particular embodiment of a keel module of the inventive modular system for a decoy.
Figure 16B:
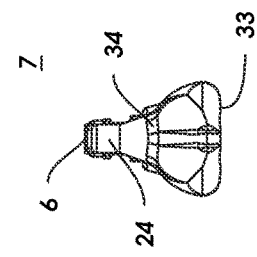
FIG. 16B is a first end view of the particular embodiment of the keel module shown in FIG. 16A.
Figure 16C:
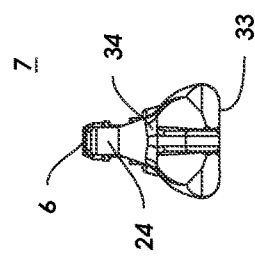
FIG. 16C is a second end view of the particular embodiment of the keel module shown in FIG. 16A.
Figure 16D:
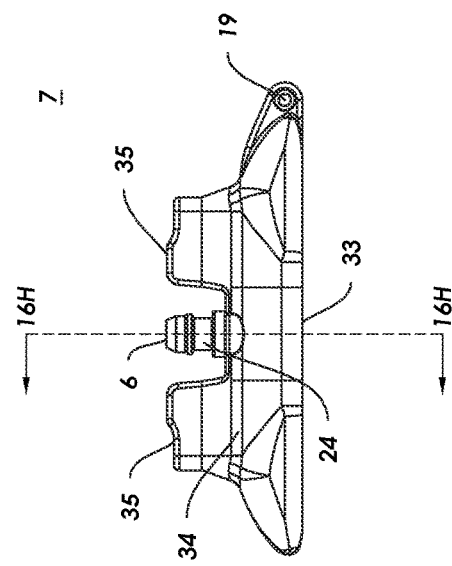
FIG. 16D is a first side view of the particular embodiment of the keel module shown in FIG. 16A.
Figure 16E:
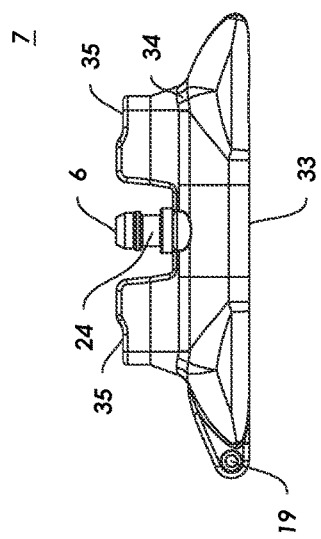
FIG. 16E is a second side view of the particular embodiment of the keel module shown in FIG. 16A.
Figure 16G:
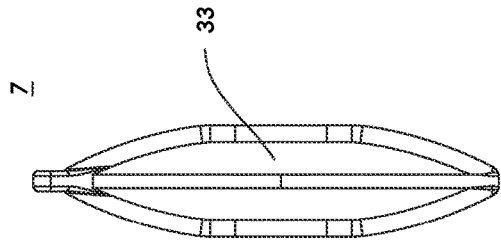
FIG. 16G is a bottom view of the particular embodiment of the keel module shown in FIG. 16A.
Figure 16F:
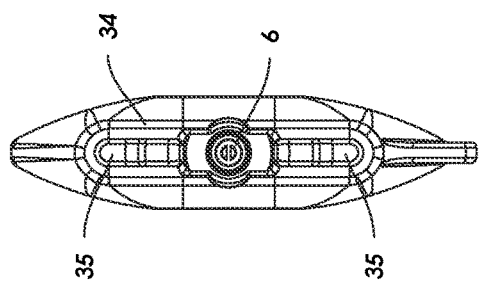
FIG. 16F is a top view of the particular embodiment of the keel module shown in FIG. 16A.
Figure 16H:
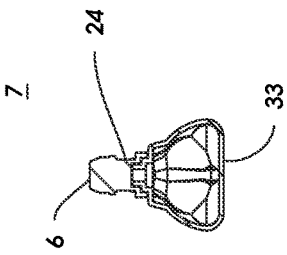
FIG. 16H is a cross-sectional view 16H-16H of the particular embodiment of the keel module shown in FIG. 16D.
Figure 17A:
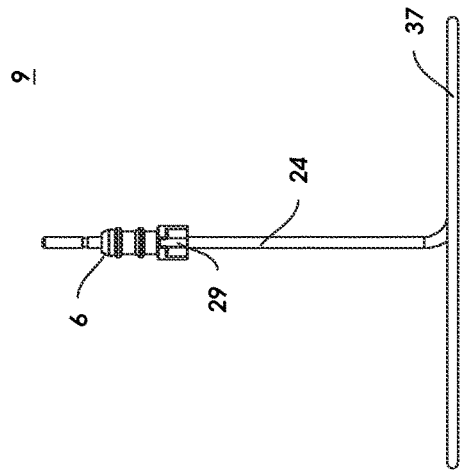
FIG. 17A is a perspective view of a particular embodiment of a stand of the inventive modular system for a decoy.
Figure 17C:
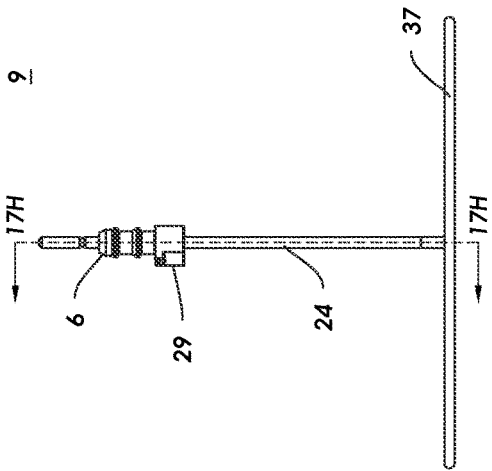
FIG. 17C is a second end view of the particular embodiment of the stand shown in FIG. 17A.
Figure 17B:
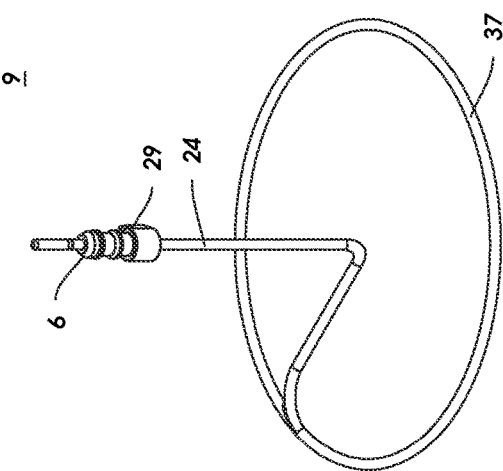
FIG. 17B is a first end view of the particular embodiment of the stand shown in FIG. 17A.
Figure 17D:
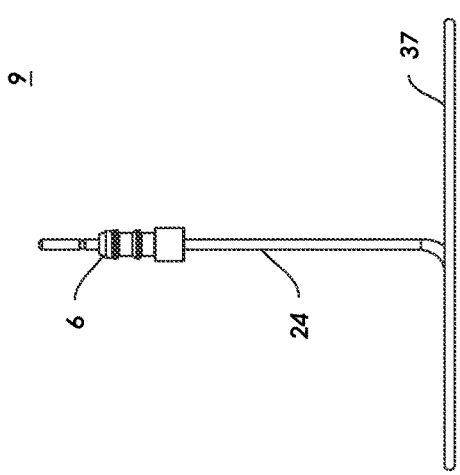
FIG. 17D is a first side view of the particular embodiment of the stand shown in FIG. 17A.
Figure 17E:
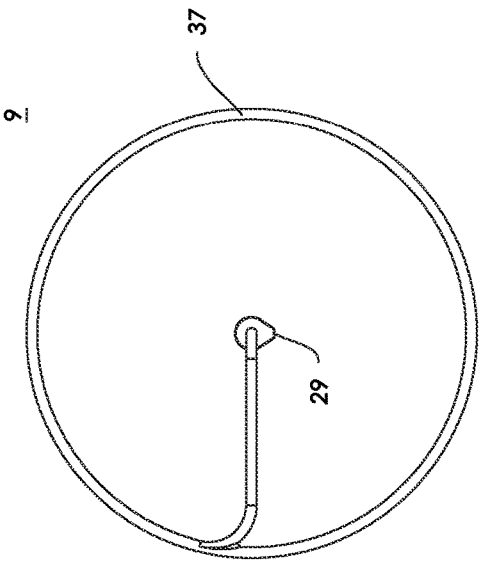
FIG. 17E is a second side view of the particular embodiment of the stand shown in FIG. 17A.
Figure 17G:
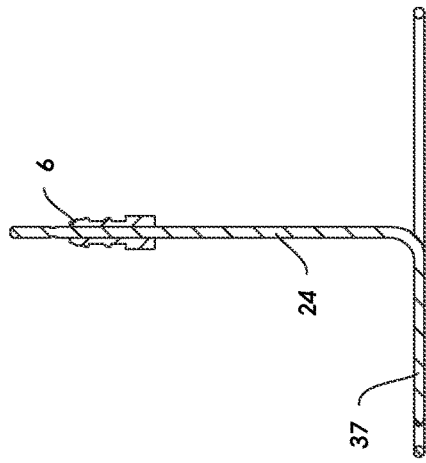
FIG. 17G is a bottom view of the particular embodiment of the stand shown in FIG. 17A.
Figure 17F:
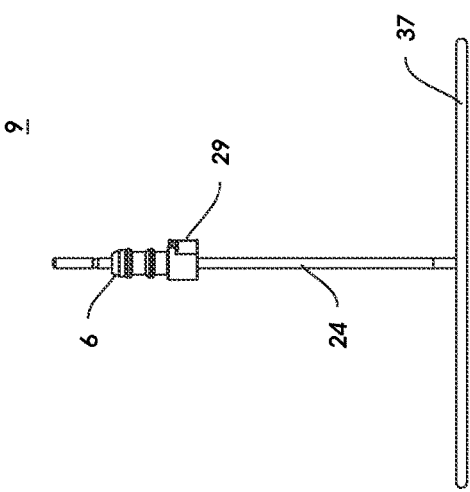
FIG. 17F is a top view of the particular embodiment of the stand shown in FIG. 17A.
Figure 17H:
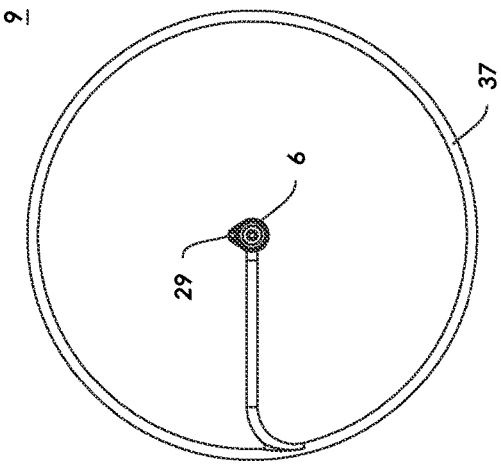
FIG. 17H is a cross-sectional view 17H-17H of the particular embodiment of the stand shown in FIG. 17D.

Regarding the latter, as to particular to embodiments, the discrete adapter (3) can be inserted into a receptacle (12) disposed in the bottom (4) of the decoy (2) (see FIG. 11) to upwardly extend therein, and subsequently fastened or secured to the decoy (2) by any of a numerous and wide variety of fastening or securement means as would be known to one of ordinary skill in the art. As but one illustrative example, the adapter (3) can include an adapter body (13) having a rim or flange (14) laterally extending from its periphery, such as from its bottom periphery, whereby the flange (14) can overlay a portion of a bottom face (15) of the bottom (4) of the decoy (2); accordingly, the flange (14) can be adherently coupled or adhesively coupled to the portion of the bottom face (15) which it overlays, hence coupling the adapter (3) to the bottom (4) of the decoy (2). By using a waterproof adherent or adhesive, a watertight seal can be formed between the adapter (3) and the decoy (2), thereby precluding liquid, such as water, from entering the interior space of the decoy (2), which may be substantially hollow, via the receptacle (12). Of course, mechanical fastening or securement means (as but one illustrative example, screws) could also be used, in which case a discrete seal element may be employed to provide a watertight seal.

As to particular embodiments, the receptacle (12) which receives the discrete adapter (3) can be formed during manufacturing. As to other particular embodiments, an existing decoy (2) can be retrofitted to receive the discrete adapter (3) by forming the receptable (12) in the bottom (4) of the decoy (2), such as by cutting a corresponding portion of the bottom (4) of the existing decoy (2), for example with a blade. Following, the instant modular system (1) can be provided as a kit for use with existing decoys (2), as further detailed below.

As to particular embodiments, the adapter (3), once coupled to the decoy (2), can be substantially flush with the bottom (4) of the decoy (2) or disposed upwardly from the bottom (4) of the decoy (2), meaning that the adapter (3) does not substantially downwardly extend from the decoy (2).

Now referring primarily to FIGS. 6D, 6I, 15G, and 15H, as to particular embodiments, the adapter (3) can include a cavity (16) defined by an adapter bottom face (17) of the adapter bottom (18), whereby the cavity (16) can upwardly extend from the flange (14). Following, the flange (14) can extend completely around the cavity (16). When coupled to a decoy (2) placed in water (8), the adapter (3) can provide a suction bottom. The flange (14) can contact the surface of the water (8), trapping a volume of air within the cavity (16) under the decoy (2), thus forming a suction that can hold the decoy (2) generally upright on the surface of the water (8) and prevent excessive bobbing while allowing the decoy (2) to float across the water (8) under the influence of wind and waves, yielding a realistic movement pattern. For this purpose, the flange (14) can be configured as a substantially flat area having a width sufficient to provide a suitable contact area for sealing with the water, hence decreasing the likelihood that the seal will be broken as a result of the motion of the decoy (2). Although illustrated as a single cavity (16), one of ordinary skill in the art will understand that the adapter bottom (18) may alternatively have a plurality of distinct and separate cavities (16) disposed therein.

Now referring primarily to FIGS. 6D, 6I, 15D, and 15E, as to particular embodiments, the adapter (3) can further include an attachment point (19) for an anchor (or weighted tether) which may function to anchor the decoy (2) to a point on the bed of the water (8), whereby the anchor can limit movement of the decoy (2) from the desired position and/or prevent the decoy (2) from drifting away or breaking formation. As but one illustrative example, the attachment point (19) can be configured as an eyelet or an aperture or a hole sized to accept and attach an anchor cord to the adapter (3). As to particular embodiments, the attachment point (19) can be coupled to the adapter bottom (18), and may be disposed within or outside of the cavity (16), depending upon the embodiment.

Now referring primarily to FIGS. 6D, 6I, 6J, 15G, and 15H, the adapter (3) includes a connector first portion (5) which removably couples to a connector second portion (6) to form a connection therebetween. As to particular embodiments, the connector first portion (5) can be configured as a female component and the connector second portion (6) can be configured as a male component, whereby the female component receives the male component, whether directly or indirectly, to form the connection. As an example, the female component can be configured as a channel (20) defined by a channel sidewall (21) which upwardly extends from the adapter body (13) and, when the adapter (3) is coupled to a decoy (2), into the receptable (12) and accordingly into the body of the decoy (2). The channel (20) can include an open bottom end (22) opposite a top end (23), whereby the male component can be inserted through the open bottom end (22) for receipt within the female component.

Correspondingly, the male component can be configured as an elongate member (24), such as a post, receivable within the channel (20) for mating engagement. As to particular embodiments, the cross-sectional shape of the elongate member (24) and the channel (20) can be similar or the same; as but one illustrative example, both the elongate member (24) and the channel (20) can have a substantially circular cross-section, thus having a substantially cylindrical geometry.

Now referring primarily to FIGS. 3D, 3F, 4D, 4F, 5D, 5F, 6D, 6I, and 6J, the mating engagement of the elongate member (24) within the channel (20) can be fastened or secured by any of a numerous and wide variety of fastening or securement elements. As but one illustrative example, the channel (20) can include at least one first protrusion (25) inwardly extending into the channel (20) from a channel sidewall inner surface (26), whereby the first protrusion (25) can be elastic, meaning capable of being deformed and subsequently capable of spontaneously returning to its original shape. As but one illustrative example, the first protrusion (25) can be configured as a rib or tab which inwardly extends into the channel (20) from the channel sidewall inner surface (26). As to particular embodiments, the first protrusion (25) can extend about the entire circumference of the channel sidewall inner surface (26), thus resembling an inwardly extending annular member (not shown). As to other particular embodiments, the first protrusion (25) can extend partially about or about only a portion of the circumference of the channel sidewall inner surface (26). Regarding the latter, as to particular embodiments, the first protrusion (25) can comprise a plurality of discrete first protrusions (25) inwardly extending into the channel (20) from the channel sidewall inner surface (26), the first protrusions (25) disposed in circumferentially spaced-apart relation. As but one illustrative example, a pair of first protrusions (25) can inwardly extend into the channel (20) from the channel sidewall inner surface (26), the first protrusions (25) disposed in diametrically opposed relation.

Now referring primarily to FIGS. 3D, 3F, 4D, 4F, 5D, 5F, and 10A through 10H, cooperatively, the elongate member (24) can include at least one second protrusion (27) outwardly extending therefrom, such as proximate a top of the elongate member (24), whereby the second protrusion (27) can laterally or radially outwardly extend from an elongate member outer surface (28). In contrast to the elastic the first protrusion (25), the second protrusion (27) can be substantially rigid, meaning not readily deformable under normal use conditions. As but one illustrative example, the second protrusion (27) can be configured as a rib or tab which outwardly extends from the elongate member outer surface (28). As to particular embodiments, the second protrusion (27) can extend about the entire circumference of the elongate member outer surface (28), thus resembling an outwardly extending annular member (not shown). As to other particular embodiments, the second protrusion (27) can extend partially about or about only a portion of the circumference of the elongate member outer surface (28). Regarding the latter, as to particular embodiments, the second protrusion (27) can comprise a plurality of discrete second protrusions (27) outwardly extending from the elongate member outer surface (28), the second protrusions (27) disposed in circumferentially spaced-apart relation. As but one illustrative example, a pair of second protrusions (27) can outwardly extend from the elongate member outer surface (28), the second protrusions (27) disposed in diametrically opposed relation. Of course, it is herein contemplated that particular embodiments can have the first protrusion (25) and the second protrusion (27) made from reverse materials such that the first protrusion (25) can be made from a substantially rigid material and the second protrusion (27) can be made from an elastic material.

Now regarding mating engagement, the elongate member (24) can be inserted into the open bottom end (22) of the channel (20) and urged toward the top end (23). During upward travel within the channel (20), the rigid second protrusion (27) can come into contact with the elastic first protrusion (25) and can be forcibly urged to deform the elastic first protrusion (25) and subsequently travel past, such as by sliding over, the elastic first protrusion (25) toward the top end (23) of the channel (20). As to particular embodiments, the elongate member (24) can continue its upward travel within the channel (20) until the top of the elongate member (24) abuts or contacts a closed top end (23) which can function as a stop element, thus stopping further upward travel of the elongate member (24) within the channel (20).

After insertion, the elongate member (24) can remain disposed in the channel (20), as downward travel of the elongate member (24) and corresponding backing out of or egressing from the channel (20) can be precluded by engagement of the second protrusion (27) with the first protrusion (25), the first protrusion (25) acting as a shoulder sized to provide sufficient frictional contact with the second protrusion (27) to prevent the second protrusion (27) from traveling past, such as by sliding over, the first protrusion (25) under normal environmental forces, such as gravity, and in the absence of forcible urging. However, as with insertion, upon forcible urging, the second protrusion (27) can again deform the elastic first protrusion (25) to travel past, such as by sliding over, the elastic first protrusion (25) toward the open bottom end (22) of the channel (20) and ultimately, the elongate member (24) can travel out of the channel (20) for removal and corresponding disengagement.

As to particular embodiments, the channel (20) can include at least two vertically spaced-apart first protrusions (25), each inwardly extending into the channel (20) from a channel sidewall inner surface (26), whereby both first protrusions (25) can function as described above, the additional first protrusion (25) acting as a second shoulder for supplementary fastening or securement.

Now referring primarily to FIGS. 3D, 3F, 4D, 4F, 5D, 5F, 6D, 6I, 6J, and 10A through 10H, as to particular embodiments, for directional engagement, the female component can include a key (29) (for example, inwardly extending into the channel (20) from a channel sidewall inner surface (26)). Following, the male component can include a corresponding keyway (30) (which may be recessed), whereby the key (29) can be matably received within the keyway (30) upon insertion of the male component into the female component, the matable reception ensuring proper rotational orientation of the male component within the female component.

As to particular embodiments, the keyway (30) can be defined within the space between two adjacent second protrusions (27) outwardly extending from the elongate member outer surface (28) and disposed in circumferentially spaced-apart relation.

Now referring primarily to FIGS. 10G and 10H, as to particular embodiments, the male component can include two different keyways (30), meaning a first keyway (30) having a first configuration and a second keyway (30) having a second configuration which differs from the first configuration, whereby receipt of the key (29) within each keyway (30) results in a different functional engagement of the male component with the female component. For example, the first and second keyways (30) can have different widths (31). The first keyway (30) can have a lesser width (31) which may be about the same size as the width of the key (29); consequently, when the key (29) is matably received within the keyway (30) upon insertion of the male component into the female component, rotational movement of the male component relative to the female component can be prohibited. Accordingly, rotational movement of the adapter (3) and correspondingly the decoy (2) about a vertical axis (32) passing through the male component can be prohibited. Conversely, the second keyway (30) can have width (31) greater than the width of the key (29); as a result, when the key (29) is matably received within the keyway (30) upon insertion of the male component into the female component, the male component can rotate relative to the female component. Accordingly, the adapter (3) and correspondingly the decoy (2) can rotate about the vertical axis (32) passing through the male component, the amount of rotation limited by the width (31) of the keyway (30). As but only an illustrative example, the width (31) of the second keyway (30) (which can comprise the arc of a circle) can be in a range of between about 10° and about 60° or between about 20° and about 50° or between about 30° and about 40°, depending upon the embodiment. Concisely, a second keyway (30) having a width (31) greater than the width of the key (29) can provide for rotatable engagement of the male component with the female component and correspondingly the adapter (3) and the decoy (2).

Of course, it is herein contemplated that particular embodiments can have the key (29) and the keyway(s) (30) disposed in reverse such that the female component can include the keyway(s) (30) and the male component can include the corresponding key (29), as shown in FIGS. 15G, 17A, and 17C through 17G.

As to particular embodiments, the male and female components can be configured such that the key (29) and the keyway(s) (30) need not engage upon insertion of the male component into the female component; correspondingly, rotation of the male component relative to the female component can be unlimited or, said another way, the male component can rotate about 360° relative to the female component.

As stated above, as to particular embodiments, the first protrusion (25) can be elastic and consequently can be formed from an elastic material. As but one illustrative example, the first protrusion (25) can be formed from an elastomer, such as rubber or rubber-like material, having a hardness of about Shore 85A. Of course, other hardnesses are herein contemplated, depending upon the embodiment. As to particular embodiments, the adapter (3) including the first protrusion (25) can be formed from the elastic material.

Now referring primarily to FIGS. 3A through 3F, 7A through 7H, 13A through 13F, and 16A through 16H, a decoy support configured as a keel module (7) can include the connector second portion (6), thereby allowing the keel module (7) to be removably coupled to the adapter (3) and correspondingly, the decoy (2), to support the decoy (2) in water (8). The keel module (7) can include a keel (33) downwardly extending from a keel module body (34), whereby the connector second portion (6) can upwardly extend from the keel module body (34) opposite the keel (33). As to particular embodiments, the keel (33) can be weighted, the weight acting as a ballast which may provide self-righting action; following, when the decoy (2) is posited in the water (8), it can orient with its bottom (4) directed down and its head directed up. Additionally, the weighted keel (33) can provide resistance to excessive bobbing or movement of the decoy (2) under windy conditions.

As to particular embodiments, the weight can be integrated into the keel (33), meaning that the keel (33) can be made or manufactured to include a desired amount of weight. As to other particular embodiments, the keel (33) can be configured as a water keel which may be open at one or both ends to allow water to collect and weigh down the decoy (2); when not in use, the water can be easily drained out of the decoy (2). As to other particular embodiments, weight (metal shot, sand, etc.) can be disposed within the keel (33) to provide a desired amount of weight.

Now referring primarily to FIGS. 7E, 7F, 16D, and 16E, as to particular embodiments, the keel module (7) can further include an attachment point (19) for an anchor (or weighted tether) which may function to anchor the decoy (2) to a point on the bed of the water (8), whereby the anchor can limit movement of the decoy (2) from the desired position and/or prevent the decoy (2) from drifting away or breaking formation. As but one illustrative example, the attachment point (19) can be configured as an eyelet or an aperture or a hole sized to accept and attach an anchor cord to the keel module (7).

Now referring primarily to FIGS. 7A through 7H, 16A, and 16D through 16F, for directional engagement, the keel module (7) can further include a key (35) upwardly extending from the top of the keel module body (34). The adapter (3) can include a corresponding keyway (36) (which may be recessed), whereby the key (35) can be matably received within the keyway (36) upon coupling of the keel module (7) to the adapter (3), the matable reception ensuring proper rotational orientation of the keel module (7) relative to the adapter (3). Of course, it is herein contemplated that particular embodiments can have the key (35) and the keyway (36) disposed in reverse such that the keel module (7) can include the keyway (36) and the adapter (3) can include the corresponding key (35).

The keel module (7) can be made from any appropriate method, such as injection molding, rotomolding, blow molding, additive printing, casting, machining, etc., and any suitable material including but not necessarily limited to: plastic, resin, polyethylene (PE), high-density polyethylene (HDPE), medium-density polyethylene (MDPE), low-density polyethylene (LDPE), linear low-density polyethylene (LLDPE), nylon (PA), polypropylene (PP), polystyrene (PS), polyurethane (PU), KOSTRATE®, K-Resign SBC, foam, ethylene-vinyl acetate (EVA) foam, polyurethane (PU) foam, expanded thermoplastic polyurethane (ETPU) foam, expanded polypropylene (EPP) foam, composite, wood, or the like.

Now referring primarily to FIGS. 4A through 4F, 8A through 8H, 14A through 14F, and 17A through 17H, a decoy support configured as a stand (9) can include the connector second portion (6), thereby allowing the stand (9) to be removably coupled to the adapter (3) and correspondingly, the decoy (2), to support the decoy (2) on the ground (10). The stand (9) can include a base (37) configured to engage with the ground (10) and in particular, to rest on top of the ground (10), whereby the connector second portion (6) can upwardly extend from the base (37). Accordingly, the base (37) can be shaped to provide a stable structure for supporting the decoy (2) when positioned on the ground (10). As to particular embodiments, the stand (9) can include a round or oval or polygonal (triangular, square, rectangular, etc.) base (37) which permits a user to stably set the stand (9) on top of the ground (10); such an embodiment may be particularly useful in frozen ground and/or snow conditions in which one might have difficulty piercing the ground (10).

As but one illustrative example, the stand (9) can be made from metal, such as steel, or other appropriate material that provides the requisite support and rigidity by any of a numerous and wide variety of methods as would be understood by one of ordinary skill in the art. As to particular embodiments, the stand (9) can be provided as a single or one-piece or monolithic construct.

Now referring primarily to FIGS. 5A through 5F and 9A through 9H, a decoy support configured as a stake (11) can include the connector second portion (6), thereby allowing the stake (11) to be removably coupled to the adapter (3) and correspondingly, the decoy (2), to support the decoy (2) in the ground (10), for example in dry ground (10) or in shallow water (8). The stake (11) can include a downwardly-directed piercing portion (38), such as a pointed portion, configured to pierce or penetrate the ground (10) and in particular, to facilitate embedding the stake (11) in the ground (10), whereby the connector second portion (6) can upwardly extend opposite the piercing portion (38). The stake (11) can be shaped to provide a stable structure for supporting the decoy (2) when positioned in the ground (10). As to particular embodiments, the stake (11) can be substantially linear with the connector second portion (6) proximate a top end and the piercing portion (38) proximate the opposing bottom end.

As but one illustrative example, the stake (11) can be made from metal, such as steel, or other appropriate material that provides the requisite support and rigidity by any of a numerous and wide variety of methods as would be understood by one of ordinary skill in the art. As to particular embodiments, the stake (11) can be provided as a single or one-piece or monolithic construct.

Now referring primarily to FIGS. 12 through 15H, as to particular embodiments, the keel module (7), the stand (9), and/or the stake (11) can be removably coupled to the adapter (3) and correspondingly, the decoy (2), by a quick connect element (39) (also known as a quick coupling or a quick disconnect). Such a mechanism can be used to quickly connect or disconnect two components, such as with a simple push or pull motion, and thus may be designed for efficiency and ease of use.

As to particular embodiments, the quick connect element (39) can be configured to couple to (i) the connector first portion (5) of the adapter (3) and (ii) the connector second portion (6) of the keel module (7), the stand (9), and/or the stake (11) for rapid connection and disconnection of the connector first and second portions (5)(6). Thus, the quick connect element (39) can connect to both the connector first and second portions (5)(6) and dispose therebetween.

As to particular embodiments, the quick connect element (39) can include a male end (40) configured for receipt within the female component of the adapter (3). As but one illustrative example, the male end (40) can be secured within the female component of the adapter (3) via mating threads.

Correspondingly, the quick connect element (39) can include a female end (41) configured for receiving the male component of the keel module (7), the stand (9), and/or the stake (11). As to particular embodiments, the quick connect element (39) can include a movable member (42) which facilitates connection to and disconnection from the male component; in particular, movement of the movable member (42), such as axial sliding, can allow for connection to and disconnection from the male component.

Of course, the quick connect element (39) is not limited to the configuration described above, as there are many and a wide variety of quick connect element configurations that can work with the present application.

The quick connect element (39) can, but need not necessarily, be discrete from the adapter (3), the keel module (7), the stand (9), and/or the stake (11). Alternatively, the quick connect element (39) can be integrated with one or more of the adapter (3), the keel module (7), the stand (9), and/or the stake (11)

As mentioned above, as to particular embodiments, the instant modular system (1) for a decoy (2) can be provided as an aftermarket kit for use with existing decoys (2), therefore facilitating retrofitting of existing decoys (2) such that a single decoy (2) can be employed in multiple environments. Following, the kit can comprise, consist essentially of, or consist of an adapter (3), a keel module (7), a stand (9), and/or a stake (11). For use, the existing decoy (2) can be modified to receive the adapter (3) by forming the receptable (12) in the bottom (4) of the decoy (2), such as by cutting a corresponding portion of the bottom (4) of the existing decoy (2), for example with a knife blade, a saw blade, or other cutting device, which may or may not be included with the kit, depending upon the embodiment. As to particular embodiments, a receptable template can be included in the kit to facilitate forming the receptable (12). Subsequent to cutting, the adapter (3) can be inserted into the receptable (12) and coupled to the decoy (2), such as by an adherent, an adhesive, or a mechanical fastener(s), for example via the flange (14), to form a watertight seal between the adapter (3) and the decoy (2). Once coupled, the decoy (2) can be used on water (8) via the suction bottom, or one of the keel module (7), the stand (9), or the stake (11) can be removably coupled thereto for its corresponding use.

As to particular embodiments, the instant modular system (1) and/or components thereof and/or the decoy (2) can include a motion drive system (not shown) configured to provide motion to the decoy (2) so that, for example, the decoy (2) may appear more lifelike and realistic looking by emulating the movements of actual waterfowl. As but a few illustrative examples, the motion drive system can propel a decoy (2), such as by a water pump(s), sculling paddle(s), propeller(s), or the like. As but a few illustrative examples, the motion drive system may drive head movement, wing movement, splashing paddles, splashing wings, spinning or rotating wings, a spinning or rotating body, a tilting body, eccentric weight movement(s), or the like.

Now regarding production, a method of making the instant modular system (1) for a decoy (2) can include providing an adapter (3) configured to couple to the decoy (2), the adapter (3) having a connector first portion (5) which removably couples to a connector second portion (6) to form a connection therebetween; providing a keel module (7) configured to removably couple to the adapter (3), the keel module (7) having the connector second portion (6); and providing a stand (9) configured to removably couple to the adapter (3), the stand (9) having the connector second portion (6).

The method of making particular embodiments of the instant modular system (1) for a decoy (2) can further include providing additional components of the modular system (1) as described above and in the claims.

Of note, elements shown above/below one another, at opposite sides to one another, or to the left/right of one another may be referred to as such, relative to one another. Further, as shown in the Figures, a topmost element or point of element may be referred to as a "top" of the component and a bottommost element or point of the element may be referred to as a "bottom" of the component, in at least one example. As used herein, top/bottom, upper/lower, upward/downward, and above/below may be relative to a vertical axis of the Figures and used to describe positioning of elements of the Figures relative to one another. As such, elements shown above or upward of other elements can be positioned vertically above the other elements, in one example. Correspondingly, elements shown below or downward of other elements can be positioned vertically below the other elements.

As can be easily understood from the foregoing, the basic concepts of the present invention may be embodied in a variety of ways. The invention involves numerous and varied embodiments of a modular system for a decoy and methods for making and using such a modular system.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "an adapter" should be understood to encompass disclosure of the act of "adapting"—whether explicitly discussed or not—and, conversely, were there effectively disclosure of the act of "adapting", such a disclosure should be understood to encompass disclosure of "adapting" and even a "means for adapting." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a protrusion" refers to one or more of those protrusions. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment.

As used herein with respect to an identified property or circumstance, "substantially" refers to a degree of deviation that is sufficiently small so as to not measurably detract from the identified property or circumstance. The exact degree of deviation allowable may in some cases depend on the specific context.

Thus, the applicant(s) should be understood to claim at least: i) each of the modular systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A modular system for a decoy, comprising:
   an adapter configured to couple to said decoy, said adapter comprising a connector first portion which removably couples to a connector second portion to form a connection therebetween;
   a keel module configured to removably couple to said adapter, said keel module comprising said connector second portion; and
   a stand configured to removably couple to said adapter, said stand comprising said connector second portion.

2. The modular system of claim 1, wherein said keel module and said stand are configured for easy, quick, and repeatable attachment to or removal from said adapter and accordingly, said decoy, facilitating use of a single said decoy in multiple environments.

3. The modular system of claim 1, wherein said decoy comprises a waterfowl decoy.

4. The modular system of claim 1, wherein said adapter is integrated with said decoy.

5. The modular system of claim 1, wherein said adapter is (i) discrete from said decoy, and (ii) couplable to said decoy.

6. The modular system of claim 5, wherein said adapter is insertable into a receptacle disposed in said bottom of said decoy to upwardly extend therein.

7. The modular system of claim 6, wherein said receptacle is formed during manufacturing of said decoy.

8. The modular system of claim 6, wherein said receptacle is formed after manufacturing of said decoy to retrofit said decoy to receive said adapter.

9. The modular system of claim 1, wherein said adapter comprises a cavity defined by an adapter bottom face of an adapter bottom;
   wherein said cavity upwardly extends from said flange; and
   wherein said adapter provides a suction bottom via said cavity.

10. The modular system of claim 1, wherein said connector first portion is configured as a female component and said connector second portion is configured as a male component receivable within said female component.

11. The modular system of claim 10, wherein said female component and said male component comprise cooperating fastening elements which fasten said male component within said female component.

12. The modular system of claim 10, further comprising a key and a corresponding keyway;
   wherein said key is configured for matable receipt within said keyway upon insertion of said male component into said female component to ensure proper rotational orientation of said male component within said female component.

13. The modular system of claim 12, further comprising two different said keyways;
   whereby receipt of said key within each said keyway results in a different functional engagement of said male component with said female component.

14. The modular system of claim 13, wherein said keyways each comprise a different width.

15. The modular system of claim 14, wherein a first said keyway has a lesser said width which, upon insertion of said male component into said female component, prohibits rotational movement of said male component relative to said female component.

16. The modular system of claim 15, wherein a second said keyway has a greater said width which, upon insertion of said male component into said female component, allows rotational movement of said male component relative to said female component.

17. The modular system of claim 1, further comprising a stake configured to removably couple to said adapter, said stake comprising said connector second portion.

18. The modular system of claim 1, wherein said connector first portion removably directly couples to said connector second portion to form said connection therebetween.

19. The modular system of claim 1, wherein said connector first portion removably indirectly couples to said connector second portion to form said connection therebetween.

20. The modular system of claim 19, further comprising a quick connect element which removably couples said connector first and second portions.

* * * * *